(12) United States Patent
Kikinis

(10) Patent No.: US 6,553,410 B2
(45) Date of Patent: *Apr. 22, 2003

(54) TAILORING DATA AND TRANSMISSION PROTOCOL FOR EFFICIENT INTERACTIVE DATA TRANSACTIONS OVER WIDE-AREA NETWORKS

(75) Inventor: Dan Kikinis, Saratoga, CA (US)

(73) Assignee: Inpro Licensing Sarl, Luxembourg (LU)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/073,019

(22) Filed: May 4, 1998

(65) Prior Publication Data

US 2002/0049833 A1 Apr. 25, 2002

Related U.S. Application Data

(63) Continuation-in-part of application No. 08/791,249, filed on Jan. 30, 1997, now Pat. No. 6,076,109, which is a continuation-in-part of application No. 08/629,475, filed on Apr. 10, 1996, now Pat. No. 5,727,159, said application No. 09/073,019, is a continuation-in-part of application No. 08/606,757, filed on Feb. 27, 1996, now Pat. No. 5,746,602, and a continuation-in-part of application No. 08/997,039, filed on Dec. 23, 1997, now abandoned.

(51) Int. Cl.[7] ............................................. G06F 13/00
(52) U.S. Cl. ..................... 709/218; 709/227; 709/238; 707/501
(58) Field of Search ................................ 709/206, 218, 709/227, 217, 246, 238; 707/1, 513, 500, 501

(56) References Cited

U.S. PATENT DOCUMENTS

| 4,039,999 | A | 8/1977 | Weston ........................ 367/132 |
| 5,150,031 | A | 9/1992 | James et al. ................. 320/164 |
| 5,159,592 | A | 10/1992 | Perkins ........................ 370/338 |
| 5,251,329 | A | 10/1993 | Takagi et al. ................ 455/572 |
| 5,325,362 | A | 6/1994 | Aziz ............................ 370/405 |

(List continued on next page.)

FOREIGN PATENT DOCUMENTS

| JP | 63-086655 | 4/1988 |
| JP | 5-274229 | 10/1993 |
| JP | 6-103189 | 4/1994 |
| JP | 8-204703 | 9/1996 |
| JP | 9-16487 | 1/1997 |
| WO | WO 97/35402 A1 | 9/1997 |
| WO | WO 97/46943 A1 | 12/1997 |

OTHER PUBLICATIONS

Tanenbaum, Structured Computer Organization, Prentice Hall, pp. 10–12, 1984.*

Bruce Zenel and Dan Duchamp "Intelligent Communication Filtering for Limited Bandwidth Environments" from the Computer Science Department of Columbia University, May 4–5, 1995, XP002094011.

(List continued on next page.)

Primary Examiner—Ayaz Sheikh
Assistant Examiner—Khanh Quang Dinh
(74) Attorney, Agent, or Firm—Woodcock Washburn LLP

(57) ABSTRACT

A system is provided for improving data transmission to computers and computerized appliances connected directly or indirectly to the Internet or other wide area data network. In this system software at a proxy server uses prestored characteristics of client devices to translate data from Internet sources into a reduced-content form adapted specifically to the client device. Unique functionality for the system includes templates provided for specifying WEB page to client translation, and special scripts for prefetching pages in real-time. Systems are provided for many sorts of client devices and hosted devices.

16 Claims, 15 Drawing Sheets

U.S. PATENT DOCUMENTS

| | | | |
|---|---|---|---|
| 5,367,556 A | | 11/1994 | Marui et al. ................ 455/569 |
| 5,530,852 A | * | 6/1996 | Meske, Jr. et al. .......... 709/206 |
| 5,533,174 A | | 7/1996 | Flowers, Jr. et al. ....... 358/1.15 |
| 5,548,727 A | | 8/1996 | Meehan ...................... 709/221 |
| 5,564,070 A | | 10/1996 | Want et al. ................. 455/507 |
| 5,572,528 A | | 11/1996 | Shuen ........................ 370/402 |
| 5,572,643 A | * | 11/1996 | Judson ...................... 709/218 |
| 5,586,260 A | | 12/1996 | Hu |
| 5,613,148 A | | 3/1997 | Bezviner et al. |
| H1641 H | | 4/1997 | Sharman ..................... 370/338 |
| 5,623,600 A | | 4/1997 | Ji et al. |
| 5,627,829 A | * | 5/1997 | Gleeson et al. ............ 370/230 |
| 5,636,217 A | | 6/1997 | Moelard ..................... 370/338 |
| 5,678,041 A | | 10/1997 | Baker et al. |
| 5,696,898 A | | 12/1997 | Baker et al. |
| 5,701,451 A | * | 12/1997 | Rogers et al. .............. 712/244 |
| 5,706,427 A | * | 1/1998 | Tabuki ....................... 713/201 |
| 5,706,507 A | | 1/1998 | Schloss |
| 5,710,883 A | | 1/1998 | Hong et al. ................. 709/246 |
| 5,727,159 A | | 3/1998 | Kikinis ....................... 709/246 |
| 5,737,619 A | * | 4/1998 | Judson ....................... 707/500 |
| 5,742,598 A | | 4/1998 | Dunn et al. ................. 370/393 |
| 5,748,897 A | | 5/1998 | Katiyar |
| 5,754,938 A | | 5/1998 | Herz et al. |
| 5,754,939 A | | 5/1998 | Herz et al. |
| 5,758,078 A | | 5/1998 | Kurita et al. ............... 709/203 |
| 5,764,235 A | | 6/1998 | Hunt et al. ................. 345/428 |
| 5,768,528 A | | 6/1998 | Stumm ....................... 709/231 |
| 5,774,670 A | * | 6/1998 | Montulli ..................... 709/227 |
| 5,781,550 A | | 7/1998 | Templin et al. |
| 5,790,789 A | | 8/1998 | Suarez ....................... 709/202 |
| 5,790,960 A | | 8/1998 | Miyashita .................. 455/572 |
| 5,805,803 A | | 9/1998 | Birrell et al. |
| 5,809,415 A | | 9/1998 | Rossmann |
| 5,812,865 A | | 9/1998 | Theimer et al. |
| 5,826,025 A | | 10/1998 | Gramlich |
| 5,835,789 A | | 11/1998 | Ueda et al. .................... 710/33 |
| 5,870,549 A | | 2/1999 | Bobo, II ..................... 709/206 |
| 5,873,045 A | | 2/1999 | Lee et al. ................... 455/550 |
| 5,892,767 A | | 4/1999 | Bell et al. ................... 370/432 |
| 5,897,644 A | | 4/1999 | Nielsen ...................... 707/513 |
| 5,907,815 A | | 5/1999 | Grimm et al. .............. 455/557 |
| 5,918,013 A | * | 6/1999 | Mighdoll et al. ........... 709/217 |
| 5,953,506 A | | 9/1999 | Kalra et al. ................. 709/231 |
| 6,014,701 A | | 1/2000 | Chaddha ..................... 709/226 |
| 6,023,714 A | | 2/2000 | Hill et al. ................... 707/513 |
| 6,073,033 A | | 6/2000 | Campo ....................... 455/566 |
| 6,073,176 A | | 6/2000 | Baindur et al. ............. 709/227 |
| 6,076,109 A | * | 6/2000 | Kikinis ....................... 709/228 |
| 6,085,247 A | | 7/2000 | Parsons, Jr. et al. ........ 709/227 |
| 6,125,285 A | | 9/2000 | Chavez, Jr. et al. ........ 455/557 |
| 6,128,649 A | | 10/2000 | Smith et al. ................ 709/217 |
| 6,154,778 A | | 11/2000 | Koistinen et al. ........... 709/228 |
| 6,195,366 B1 | | 2/2001 | Kayashima et al. ........ 370/475 |
| 6,233,017 B1 | | 5/2001 | Chaddha ................ 375/240.12 |
| 6,243,596 B1 | | 6/2001 | Kikinis ....................... 455/572 |
| 6,253,241 B1 | | 6/2001 | Chaddha ..................... 709/223 |
| 6,324,648 B1 | | 11/2001 | Grantges, Jr. ............... 713/201 |
| 6,339,794 B2 | | 1/2002 | Bolosky et al. ............ 709/233 |
| 6,341,133 B1 | | 1/2002 | Kawamoto et al. ......... 370/401 |
| 2001/0002851 A1 | | 6/2001 | Shimada et al. ......... 348/423.1 |

OTHER PUBLICATIONS

"GloMop: Global Mobile Computing By Proxy" Position Paper, Sep. 13, 1995, XP002094009.

Terri Watson, "Application Design for Wireless Computing" Workshop on Mobile Computing Systems and Applications, Santa Cruz, CA., Dec. 8–9, 1994.

Tomasz Imielinski and Henery F. Korth "Mobile Computing", Jan. 1996.

Armando fOX and Eric A. Brewer "Reducing WWW Latency and Bandwidth Requirements by Real–Time Distillation" from the 5th International WWW Conference, May 6–10, 1996 Paris, France.

Marc Abrams, Charles R. Stanridge, Ghaleb Abdulla, Stephen Williams, Edward A. Fox—"Caching Proxies: Limitations and Potentials" Oct. 7, 1995.

Chikarmane et al., Mobile IP–based Multicast as a Service for Mobile Hosts, pp. 11 to 18, IEEE, 1995.

"Cyberscope –Hot Properity–A Smart Phone Gets Smarter" (1 page) from Newsweek (USA) Feb. 22, 1999.

Fox A., et al., "Reducing WWW latency and bandwidth requirements by real–time distillation" Computer Networks and ISDN Systems, Elsevier Science BV vol. 28, 1996 pp. 1445–1456.

Gessler, S. et al. "PDAs as Mobile WWW Browsers" Computer Networks and ISDN Systems, vol. 28, No. 1 Elsevier Science BV Dec. 1, 1995 pp. 53–59 XP004001210 ISSN: 0169-7552.

Kawamata, Y. Internet Technique in the Multimedia Era, Interface, CQ Publishing Company, Sep. 1, 1995, vol. 21, No. 9, pp. 151–166.

Megzari, O. Et al., "A Distributed Platform for Interactive Multimedia" 1994 Canadian Conference on Electrical and Computer Engineering, 775–758 (Mediabase Laboratory Dept. Of Electrical Engineering, University of Ottawa.

Perkins, Charles E. Simplified Routing for Mobile Computers Using TCP/IP, pp. 7–13, IEEE, 1992.

Qu et al., A Practical Method for Achieving Portable Communications in the Internet Context, 1512–1516, IEEE, 1995.

Rothermel, Kurt et al., "QoS Negotiation and Resource Reservation for Distrubuted Multimedia Applications" Proc. IEEE International Conference on Multimedia Computing and Systems, 319–326 (1997).

Simpson, W., I Png Mobility Considerations, Ipng Mobility, Network Working Group, pp. 1–9, Aug. 1994.

Wang, R. Et al. "A Multimedia File Structure for Continuous and Discrete Media" Canadian Conference on Electrical and Computer Engineering, 644–647 IEEE (1993).

Williams, T. "Embedded Oss Hustle to Support Networked Devices" Electronic Design vol. 45, No. 11, May 27, 1997 pp. 113–114, 116.

Yang, Oliver et al., Modeling and Performance Analysis of File Transfer in a Satellite Wide Area Network; IEEE Journal on Selected Areas in Communications, vol. 10, No. 2, pp. 428–436 Feb. 1992.

My T. Fred Burghardt, Srinivasan Seshan, and Jan Rabaey, InfoNet: the Networking Infrastructure of InfoPad, Proceedings of Compcon, Mar. 1995, pp. 1–6, Electrical Engineering & Computer Sciences Department, University of California, Berkeley.

Charles Brooks, Murray S. Mazer, Scott Meeks, and Jim Miller, Application–Specific Proxy Servers as HTTP Stream Transducers, www.w3.org/Conferences/WWW4/Papers/56/, Feb. 6, 2002, pp. 1–11.

Todd Courtois and Ray Rischpater, Portal: A PDA–to–World–Wide–Web Interface, PDA Developers, Jan./Feb. 1995, 3.1, Creative Digital Publishing Inc., pp. 1–3.

Joel F. Bartlett, Experience with a Wireless World Wide Web Client, IEEE, 1995, pp. 154–157, (a portion of this material was presented at the IEEE Workshop on Mobile Computing Systems and Applications, Dec. 1994, Santa Cruz, California).

Sebastian Rupley, Web Terminals Take Shape, PC Magazine Online, www.zdnet.com/pcmag/issuses/1504/pcm00015.htm, Feb. 20, 1996, pp. 1–3.

AT&T's Internet Phone Becomes Official, PC Magazine Online, www.zdnet.com/pcmag/news/trends/t960716a.htm, Jul. 16, 1996, pp. 1–2.

Netscape Backs Navio, PC Magazine Online, www.zdnet.com/pcmag/news/trends/t960826a.htm, Aug. 26, 1996, pp. 1–3.

Preston Gralla, (chapter 14) How Network Computers (NCs) Work, How the Internet Works, 1997, submitted pp. 1–8, Macmillan Computer Publishing, US.

Unknown, XHTML (TM) 1.0: The Extensible HyerText Markup Language, http://www.w3.org/TR.xhtml1, Jan. 26, 2000, all pages, W3C Internet.

Joel F. Bartelett, Experience with a Wireless World Wide Web Client, WRL Technical Note TN–46, Mar. 1995, pp. 1–13 Digital Western Research Laboratory, Palo Alto, CA, US.

* cited by examiner

TAILORING DATA AND TRANSMISSION PROTOCOL FOR EFFICIENT INTERACTIVE DATA TRANSACTIONS OVER WIDE-AREA NETWORKS

CROSS-REFERENCE TO RELATED APPLICATIONS

The present application is a continuation-in-part (CIP) application from U.S. patent application Ser. No. 08/791,249, filed Jan. 30, 1997, U.S. Pat. No. 6,076,109 which is a CIP from prior application Ser. No. 08/629,475, filed Apr. 10, 1996, now U.S. Pat. No. 5,727,159. The present application is also a CIP from application Ser. No. 08/606,757, filed Feb. 27, 1996 now U.S. Pat. No. 5,746,602 and from application Ser. No. 08/997,039 filed Dec. 23, 1997, now abandoned. The prior applications are incorporated in the present application in their entirety by reference.

FIELD OF THE INVENTION

The present invention is in the area of apparatus and methods including software for providing data from data sources over wide-area networks such as the Internet to end users, with the data tailored to the needs of the end users.

BACKGROUND OF THE INVENTION

There are many motivations to computer development, depending largely on targeted customer groups. For example, a certified public accountant needs to run applications having to do with accounting, taxes, financial planning, and the like, while a fiction writer may wish only to use a computer as a word processor. In short, the kind of system and the sorts of software different people might choose to own or use may be vastly different from the selections others might make. These preferences divide the purchasing public into definable, often overlapping customer bases. Manufacturers plan research and development to produce products that appeal to these targeted customer bases. These trends and the ever-increasing power, modularity, and applicability of computer devices has led to an ever-growing body of specialized, computerized devices in the marketplace which are typically termed in the art computer appliances. A WEB TV apparatus, for example, is a computerized appliance. Pagers and Smart telephones are other examples. There are many, many more.

Even with the considerable differences in needs between different consumer groups, there are still many commonly desirable traits in development of computers of all sorts and computerized appliances. For example, regardless of the ultimate functionality of a particular sort of computer or appliance, a low cost to manufacture is a desirable characteristic. Another often desirable characteristic is portability. There are advantages to being able to easily move one's computing tools and appliances from place to place, and even greater advantages to having some computers and appliances small enough to carry in a pocket or purse.

Even though portability and small size is generally desirable, power and functionality are always desirable as well, and these characteristics are competitive. Conventionally and historically one pays a power and functionality penalty for small size and portability.

One of the penalties typically paid is functionality as related to battery life. That is, if one uses a powerful and fast CPU in a portable computer or computerized appliance, the size of the battery must typically be quite large, and life between charges will typically be relatively short. For example, it can be shown in general that 100 grams of battery weight, fully charged, will power about $5 \times 10^8$ computer instructions. It is to be understood that this is a general figure simply for illustrative purposes, and may vary for different CPUs, types of batteries, and the like.

Given the figure above relating battery weight to a number of computer instructions for illustrative purposes, if a portable computer or appliance is to be provided with ability to execute relatively high-overhead applications, such as HTML files in Internet applications, the CPU for the portable computer will have to operate at 1 to 2 MIPS (million instructions per second). Assuming 1 MIPS, a battery weight of 100 g. will discharge in about 8 minutes. A five hundred gram (a little over one pound) battery will provide a life between charges of about 41 minutes.

It is seen, then, that as applications and desired functions for personal computers become more sophisticated, it becomes ever more difficult to provide theses applications and functions for small, personal, battery-powered computers and appliances.

There are some ways that battery life may be extended or optimized. For example, power-management techniques may extend battery life by 1.5 times, use of low-power integrated circuit technology can add another factor of 1.5, sophisticated electrical storage technology another 1.5, and solar recharge perhaps another 1.2. The net multiplier, using every means of help is about 5, so a 500 g battery may then power such a computer or appliance for about three hours. Five hours is still a relatively short battery lifetime, so sophisticated operations for small, portable computers and appliances, such as World Wide Web (WWW) browsing on the Internet, are not, until the time of the present invention, very practical.

Of course, battery size and life is not the only characteristic of concern. Generally speaking, any development in data transfer that can increase functionality for data network-connected portable computers and appliances will also impact, in some manner, all data-network dependent devices, such as personal PCs having Internet access.

Further to the above discussion, as the global network of connected databases known as the World Wide Web continues to grow, social and political concerns grow as well. Many are concerned that the expense and complexity of end-use computers sand appliance suitable for WEB-connected functionality is a formidable barrier to increased information access by disadvantaged millions, for which WEB access may be seen as a tool for empowerment and social and political advancement. Generally speaking, then, formidable improvement in data exchange between digital data network-connected data sources and end use computers and appliances promises significant benefits for large populations.

What is clearly needed are apparatus and methods, including software, whereby functionality of digital network-connected and dependent devices, such as computers and computerized appliances, may be maintained and even significantly enhanced while greatly reducing the aggregate data traffic between data sources and the dependent computers and appliances.

SUMMARY OF THE INVENTION

In a preferred embodiment of the invention, in a WEB browsing system a method is provided for minimizing data to be transmitted to a client device from a Web server, comprising steps of (a) creating a listing of parameters derived from one or more of characteristics of the client device, characteristics of a WEB page, and preferences of a customer using the client device; (b) storing the parameters as a template at the Web server; (c) accessing a WEB page requested by the customer; (d) translating the WEB data according to the template; and (e) transmitting the translated data to the client device. The parameters may include details of a display used by the client device.

In another preferred embodiment a software template is provided for use in translating WEB data to a reduced-data form to be transmitted to a client device from a WEB server. The template comprises one or more parameters derived from characteristics of the client device; and control routines adapted for applying the parameters in translating data from a WEB page for transmission to the client device. The template may further have one or both of parameters derived from characteristics of a WEB page and customer preferences. One of the parameters may be derived from characteristics of a display used by the client device.

In another aspect of the invention, in a WEB browsing system using templates listing parameters derived from one or more of characteristics of a client device, characteristics of a WEB page, and customer preferences in reducing data content of files to be transmitted to the client device, a template editor is provided, comprising a client interface for displaying characteristics of the template; and tools for altering the characteristics. In some embodiments the editor executes on the client device, and in others on a WEB server as a part of a WEB page, wherein the editor is adapted for manipulation by a client accessing the WEB page.

In another aspect, in a WEB browsing system, a Mark-Script for use by a WEB server hosting a customer operating a client device is provided, the Mark-Script comprising a list of Web pages to be accessed on behalf of the client; and control routines adapted for accessing the WEB pages one-after-another and storing the contents at the WEB server for transmission on demand to the client device. The Mark-Script may be adapted for executing a refresh process on signal from the client device, wherein the refresh process comprises refreshing a current WEB page being perused by the client device and also refreshing all pre-fetched and stored WEB pages according to the list of WEB pages.

In another aspect a method for WEB browsing by a client device is provided, comprising steps of (a) preparing a Mark-Script comprising a list of Web pages to be accessed on behalf of the client device, and control routines adapted for accessing the WEB pages one-after-another and storing the contents at the WEB server for transmission on demand to the client device; (b) accessing the WEB server by the client device and initiating execution of the Mark-Script; and (c) interacting with WEB pages transmitted by the WEB server to the client device according to the list. In this method there may be a step for refreshing WEB pages retrieved and stored for a client on signal from the client.

In another aspect a method for sequential browsing by a server on behalf of a client device is provided, comprising steps of: (a) accessing a Mark-Script stored at the server and associated with the client device, the Mark-Script listing a sequence of WEB pages to be accessed for the client; (b) accessing the listed WEB pages and storing the retrieved data at the server; and (c) transmitting the stored pages to the client device on demand. There may further be a step for refreshing current and stored, pre-fetched WEB pages on signal from the client. There may also be a step for reducing content of pre-fetched WEB pages before transmission to the client device, by consulting parameters based on characteristics of the client device. There may further a step for passing through to a client a request initiated by a pre-fetched page not yet transmitted to the client, either during or after pre-fetch. Such requests may typically be for identification or security verification.

In another aspect a system for Internet browsing is provided, comprising a host computer connected to one or more peripheral devices and to the Internet; and a WEB server adapted for browsing the Internet for the host. The WEB server fetches WEB pages for the host computer and reduces data content before transmission to the host based on characteristics of one of the peripheral devices connected to the host. In this system the WEB server may also follow a script furnished by the host computer for pre-fetching WEB pages and storing them at the WEB server for transmission to the host computer on demand.

In another aspect a system for Internet browsing comprising a client device connected to a WEB server adapted to browse legacy system sites on the client's behalf is provided, the system comprising a source-side template adapted for converting data requested by the WEB server to an Hyper Text Markup Protocol (HTML) before transmission to the WEB server; and a client-side template adapted for reducing data content of the data at the Web site according to characteristics supplied by the client device before transmission of the data to the client device.

In the several embodiments of the invention systems and methods are provided enhancing access and transmission of data from remote data sources and providing the data to client devices in a manner maximizing data transfer efficiency beyond what is available in the art.

BRIEF DESCRIPTION OF THE DRAWINGS

FIG. 4 is a second part of the exemplary session script for which FIG. 3 is a first part.

DESCRIPTION OF THE PREFERRED EMBODIMENTS

Figure 1:
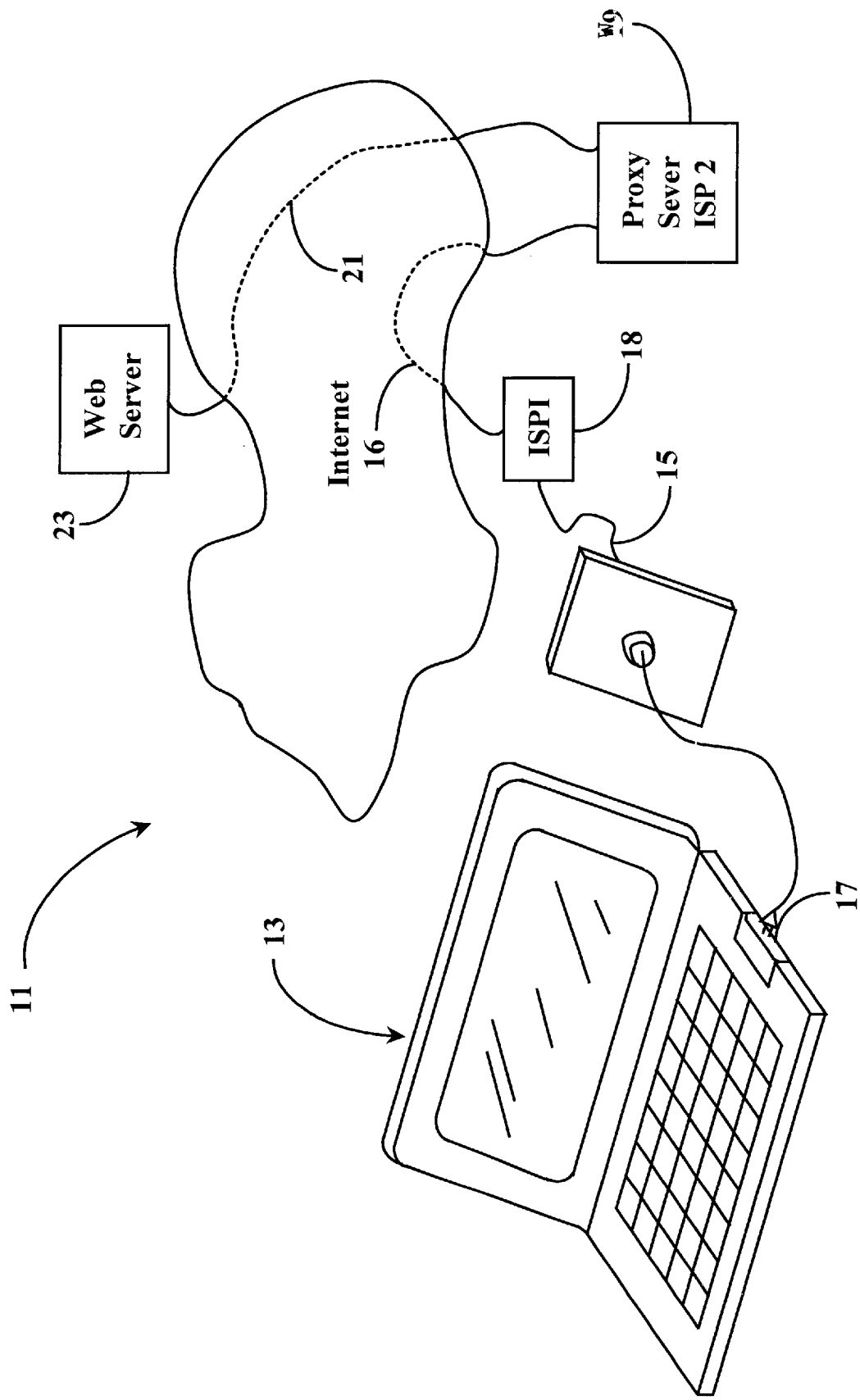
FIG. 1 is a largely diagrammatical illustration of a Proxy-Server system according to an embodiment of the present invention.

FIG. 1 is a largely diagrammatical illustration of a computing system 11 according to an embodiment of the present invention. In this embodiment a hand-held computer 13 is connected via a telephone line 15 through a modem 17 to a first dial-up point 18, which may be an Internet Service Provider. Accordingly, dial-up point 18 is labeled ISP 1. In this arrangement a Proxy-Server 19 according to an embodiment of the present invention is established as a server on the Internet, and a command from unit 13 to ISP 1 results in connection through a TCP/IP pipe 16 to Proxy-Server 19. Proxy-Server 19 is also labeled ISP 2, for Internet Provider 2. Proxy-Server 19 has links to other Web servers on the Internet as. is known in the art, and may open TCP/IP paths 21 to any such Web server.

In alternative arrangements, connection may be by modem from unit 13 directly to Proxy-Server 19. Alternatively, Proxy-Server 19 may be a node on a LAN at a corporate system. In all cases of embodiments of the invention, communication from unit 13 to Web Servers on the Internet is through Proxy-Server 19.

In this embodiment hand-held computer 13 is a high-end personal organizer, such as a Sharp Wizard™ personal organizer. The hand-held computer, however, can be any one of a large number of commercially available computing devices with a broad range of capabilities, including those devices known as personal digital assistants (PDAs). In other embodiments and aspects of the present invention, the computer used by a person to access and interact with the Proxy-Server in practicing the present invention need not be a hand-held, or even a portable computer in the sense the terms are used in the art. In some aspects, capabilities of a field unit according to the present invention are built into a set-top box for a TV system or directly into a TV set.

Most computers capable of modem communication can serve to practice the invention, and, in the following discussion, the terms field computer or field unit are used to generally indicate a computer used anywhere for primary Internet access, whether through and in cooperation with a Proxy-Server according to an embodiment of the present invention, or not.

Even though the present invention is not limited to hand-held, battery-powered computers, but is applicable to personal computers of all types, the techniques of the invention are particularly advantageous when used with portable, battery powered devices as filed units, because they provide a way to accomplish relatively sophisticated computer operations with low-end, low-power CPUs. This technique is particularly effective in saving power relative to functionality, which provides greatly extended battery life.

Returning to FIG. 1, in this arrangement, computer 13 has a modem 17, and is connected via phone lines 15 to a Proxy-Server 19, as described above, such as through a first dial-up point. This connection is convenient, but not required. There are a number of other ways computer 13 may be connected to the Internet, or to a similar Proxy-Server without telephone lines, such as by a satellite link or cable modem, or by a combination of data links. Also, the modem shown may be a built-in modem or an external modem, and may also be either an analog modem or a digital link such as an Integrated Services Digital Network (ISDN) modem.

Proxy-Server 19 in this arrangement is unique. In a conventional system, proxy-servers, if used at all, are used only for caching and security. In embodiments of the present invention the Proxy-Server performs much of the computing that computer 13 would otherwise be obliged to perform. Proxy-Server 19 and its functionality with computer 13 is described in more detail below.

Figure 2:
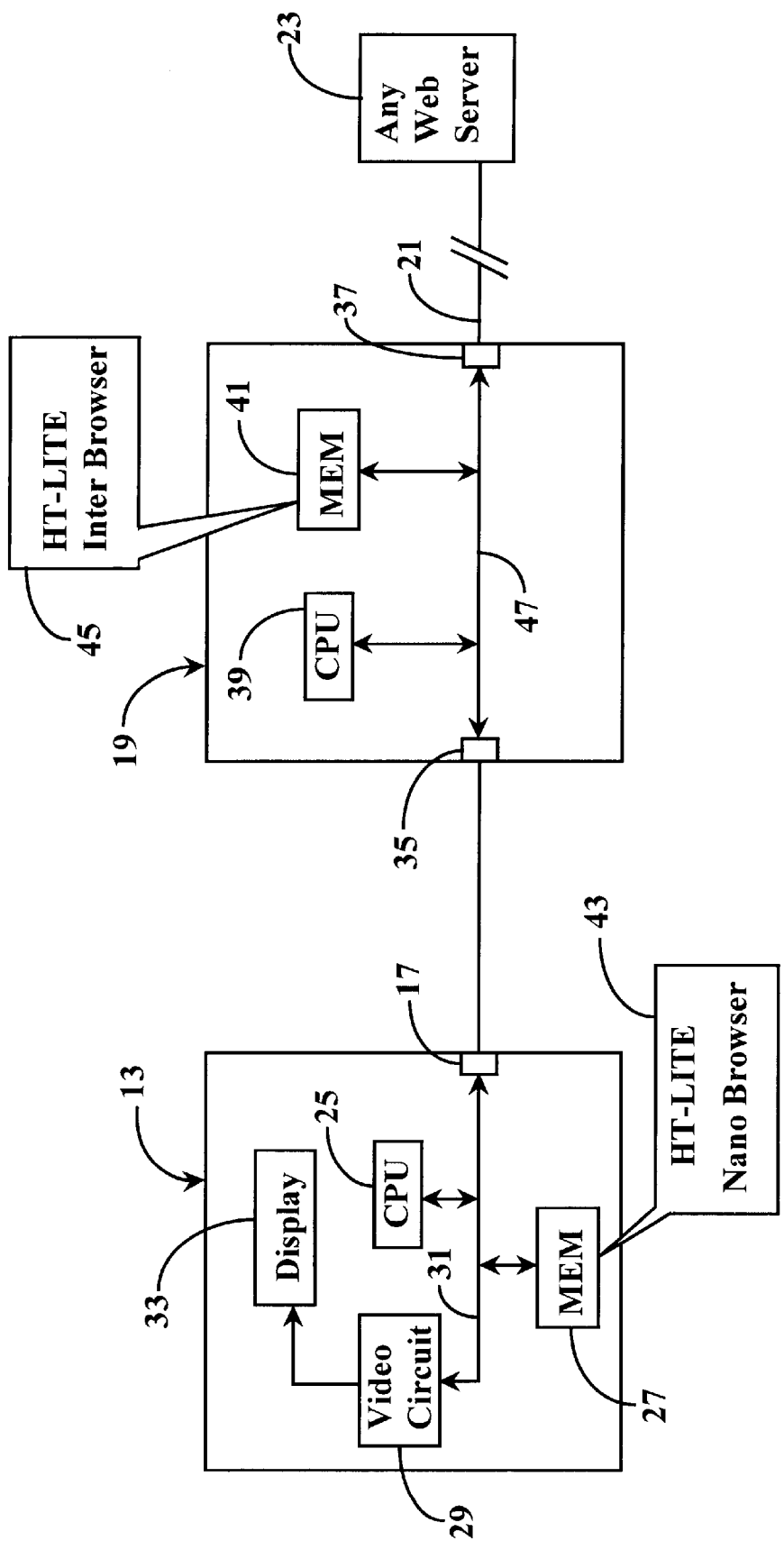
FIG. 2 is a diagram of a portable computer and a Proxy-Server from FIG. 1, showing additional detail.

FIG. 2 is a diagrammatical illustration of hand-held computer 13, Proxy-Server 19, and WEB server 23 from FIG. 1 showing additional detail. In FIG. 2, computer 13 is shown connected directly to Proxy-Server 19, but could be connected by a number of ways, as is described more generally above.

Computer 13 has a CPU 25, a memory 27, video adapter circuitry 29, and modem 17 all communicating on bus 31. Video circuitry 29 drives a display 33. Memory 27 may be any of a number of types, such as flash, random access (RAM), read-only (ROM) or similar type, or a combination of these. There may be other components as well, but these are not shown to facilitate description of the unique aspects of this embodiment of the invention. The hardware arrangement is intentionally shown as general, and is meant to represent a broad variety of architectures, which depend on the particular computing device used.

Proxy-Server 19 is a relatively sophisticated and powerful computer typical of computers used as WEB servers, although the use in this embodiment of Proxy-Server 19 is not the conventional or typical functions of a WEB server as known in the art. Proxy-Server 19 has a CPU 39, a memory 41 and a means of connecting to a network. The network connecting means in this embodiment is a modem 35 communicating on a bus 47. In other embodiments the network connecting means may be a network adapter or other.

Modem 35 in the embodiment shown is compatible with modem 17 in computer 13. In other embodiments link 15 may be of a different sort, and connection may be made through a dial-up point as shown in FIG. 1. A communication port 37 connects to communication link 21 (FIG. 1), providing communication with conventional WEB server 23, which represent any WEB server that may be accessed on the World Wide Web.

Port 37 and link 21 may be any of several types. In some embodiments, server 23 and server 19 will be nodes on a local area network (LAN), and the link between the two servers will be a serial network link with port 37 being a LAN card according to any of a number of well-known protocols. In other embodiments link 21 may be another telephone line, and port 37 will be a telephone modem. In still other embodiments, this link could be a parallel communication link.

Proxy-Server 19 exists in this embodiment of the invention to perform functions enabling hand-held computer 13 to operate as an apparently powerful web-browsing machine, even though the stand-alone capability of computer 13 will not even begin to support such functionality. As is well-known in the art, for a computer to be a fully-functional web-browsing system requires a high-performance CPU and execution of relatively sophisticated web-browsing and display applications. Such a computer typically has to operate, as described above, at or above a million instructions per second.

In the embodiment of the present invention shown by FIGS. 1 and 2 Proxy-Server 19 executes a program 45 the inventor terms an InterBrowser. The InterBrowser combines functionality of a conventional web browser with special functions for recognition of and communication with hand-held computer 13. Commands from computer 13, such as, for example, a command to access a WEB page on the World Wide Web, are received by Proxy-Server 19 operating the InterBrowser program, and acted upon as though they are commands received from a conventional input device such as a keyboard.

Following the example of a command communicated over link 15 from computer 13 for accessing a WEB page (typically a Universal Resource Locator (URL), Proxy-Server 19 accesses the appropriate server (in this case server 23) over link 21, and downloads the appropriate data over link 21. Proxy-Server 19 therefore has HTML and TCP/IP capability, and typically has access to and capability of executing a host of other routines as known in the art for supporting WEB browsing and accessing data through the World Wide Web. These routines and this functionality are all very well-known to those with skill in the art.

Proxy-Server 19, instead of displaying the downloaded data (or playing video and/or audio output, as the case may be, depending on the downloaded data), translates the data to a simpler communication protocol and sends the data to computer 13 for output over link 15 in a TCP/IP protocol. Link 15 becomes a dedicated TCP/IP pipe to and from Proxy-Server 19. Proxy-Server 19 thus acts as a proxy for computer 13, performing those functions of WEB browsing computer 13 cannot perform.

Computer 13 through execution of a program the inventor terms a NanoBrowser 43 sends commands entered at computer 13 over link 15 to Proxy-Server 19 and accepts- data from Proxy-Server 19 to be displayed on display 33. Data is transferred in a protocol the inventor terms HT-Lite. The NanoBrowser also provides for interactive selection of links and entry into fields in displays, as is typical for WEB pages displayed on a computer screen. The NanoBrowser provides for accepting such entry, packaging data packets in TCP/IP form, and forwarding such data to Proxy-Server 19, where much greater computer power provides for efficient processing.

In conventional WEB browsing, all final processing takes place at the browser's computer, and those who establish WEB servers assume that browsers will operate with sufficiently powerful equipment and programs to accomplish all of the necessary processing. No such processing is done at the WEB servers.

One of the processing tasks that has to conventionally occur at the browser's computer is processing of received data into a format to be displayed on whatever display the user has. There are, as is well-known in the art, many types of displays and many display modes. These range all the way from relatively crude LCD displays to high-resolution, multi-color displays. There are, in addition, a number of other functions that have to be performed conventionally at a user's computer to interact effectively with the WWW. For example, audio and video and some other functions typically require supplemental, or helper, applications to be installed on or downloaded to a field unit to process audio and video data and the like.

Most data transferred by WEB servers assumes relatively high-end displays, such as color SVGA displays as known in the art. In PDAs and digital organizers, such as those anticipated for use in the present invention, the displays are relatively low resolution, and are typically LCD in nature. In the system described with the aid of FIGS. 1 and 2 Inter-Browser program 45 at the Proxy-Server and the HT-Lite NanoBrowser program at the hand-held unit cooperate in another manner as well. When one connects to the Proxy-Server the hand-held unit, through the HT-Lite Nano-Browser program, provides a signature which the Proxy-Server compares with logged signatures.

An ID match when connecting a hand-held unit to the Proxy-Server provides the Proxy-Server with information about the hand-held unit, such as CPU type and power, screen size, type and resolution, presence of a pointer device, and sound capability. The Proxy-Server then uses this specific information to translate HTML and other files from the Internet to a form readily usable without extensive additional processing by the hand-held unit. For a small monochrome LCD display a 60k/70k JPEG file becomes a 2k/4k bit map, for example. Also, multi-file pages are recombined into single file pages. This translation also minimizes bandwidth requirement for link 15, and speeds transmission of data.

It is in this ability of the Proxy-Server to do the heavy computing, of which the translation of HTML files is a single example, that is responsible for a unique ability of hand-held devices in practicing embodiments of the present invention to accomplish functions that they could not otherwise accomplish, and to do so without inordinate usage of stored energy. In various embodiments of the present invention, hand-held devices with CPUs having an ability to run at from 0.001 to 0.05 MIPs can serve as WEB browsers, displaying WEB pages and allowing users to initiate on-screen links and to input data into input fields. Given the above example of MIPs requirement for WEB browsing, where currently available solutions may provide a 5×advantage, practicing the present invention can provide an advantage of up to 2000X, resulting in battery life approaching 2 weeks (given a 100 g battery weigh), where expected battery life for similar functionality with a powerful CPU was calculated as 8 minutes.

There are many functions other than simple WEB browsing that are desirable for a hand-held devices like those contemplated to be used with systems according to embodiments of the present invention. The typical functions for digital organizers and PDAs, for example, such as scheduling of appointments, listing phone numbers, addresses and the like, taking notes, sending faxes and E-mail and so forth, and such tasks as currency conversion, are still provided by a hand-held unit executing HT-Lite. Now, however,these functions are more interactive than previously, as data for these functions can be exchanged through the TCP/IP link with the Proxy-Server, which may access data from a variety of sources to update data for such functions.

In a preferred embodiment of the present invention a variety of Groupware functions are supported, wherein a database having variable data such as appointment schedules for employees may be accessed from several different points, such as from a computer at home, a computer on a network at the office, and a hand-held computer in the field, through a Proxy-Server connection. In such interactive circumstances, date and time monitoring may be used so files in different locations may be updated when connection is made between units having different versions of a file. Also, access may be provided selectively, so, if preferred, only certain persons may have access to certain files. For example, one user could grant another access to his or her appointment schedule, such that one could make an appointment for oneself on another's appointment schedule.

To practice the invention, given an accessible WEB server configured as a Proxy-Server according to an embodiment of the present invention, one needs only to load HT-Lite NanoBrowser software on a computer and to provide Internet access for the computer, such as by a telephone modem. In many cases, candidate computers have built-in modems. In other cases, an external modem may be provided and connected. In the case of hand-held devices, such as PDAs and organizers, some have an ability to load software via a serial port, a PC card slot, through the modem extant or provided, or by other conventional means. IN some cases, all operating code is embedded, that is; recorded in read-only memory. In some of these cases, adding HT-Lite routines may require a hardware replacement. In virtually all cases of hand-held devices, however, the necessary routines can be provided.

One of the components of the HT-Lite NanoBrowser software is a minimum browser routine termed by the inventor a NanoBrowser. The NanoBrowser is capable of exerting a URL over the modem connection to access the Proxy-Server. Theoretically, one could exert a URL of a WEB site other than the Proxy-Server, but the result would be an unusable connection, as the small hand-held unit would not be able to handle the sophisticated data provided to be downloaded.

Connection to the Proxy-Server provides the Proxy-Server with information as to the subscriber and the subscriber's equipment. These operations proceed in a manner well-known in the art for such log-on and security transactions. Once access is extended to the user, an interface is provided for the user to browse in a manner very similar to well-known WEB interfaces. That is, the user's display provides an entry field for a URL which is asserted by an enter key or the like. There may also be an address book for often-visited sites, as is common with more powerful machines.

Developers are quickly introducing new and useful features for WEB browsing, such as an ability for users to access electronic documents through access to their own WEB pages, machine-independently. All such features will be available in the practice of the present invention, as there is nothing in the invention that inherently restricts use more than the use of more powerful machines.

Similarly, there are no strict requirements for the location of the Proxy-Server or of accessible WEB servers in embodiments of the present invention. No restrictions are placed on such locations beyond restrictions on servers in general. In one embodiment, a corporation with multiple and perhaps international locations may have a local area network with one or more Proxy-Servers, and employees, particularly those employees whose job functions require travel, are provided with hand-held digital assistants according to an embodiment of the present invention. Multiple functions are then provided over Internet connection in Internet protocol, far beyond what could otherwise be provided with small and inexpensive units; and battery life would be far beyond what would otherwise be expected.

Figure 3:
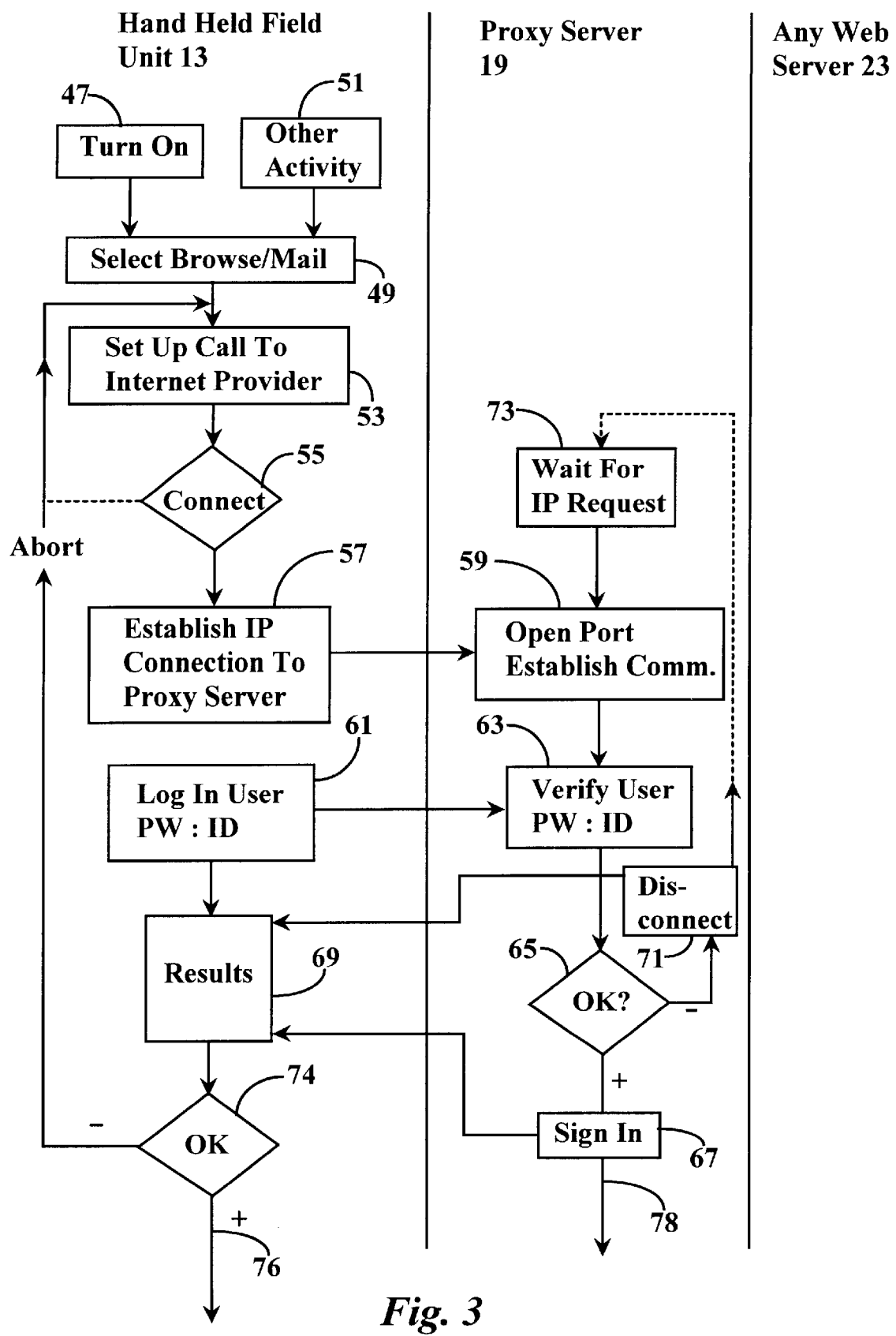
FIG. 3 is a diagram showing a first part of an exemplary session script between a hand-held computer, a Proxy-Server, and a WEB server according to an embodiment of the present invention.
Figure 4:
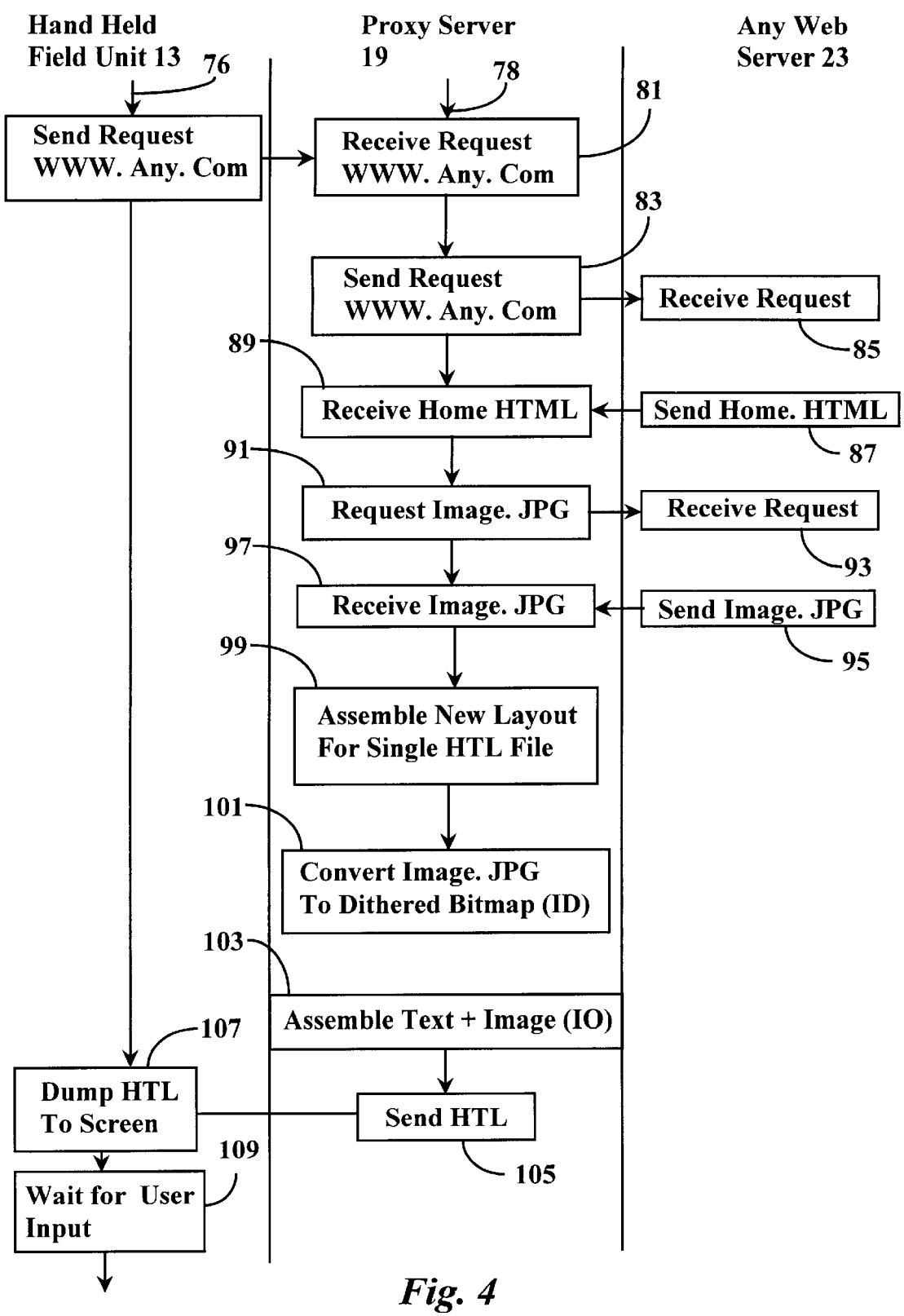

FIGS. 3 and 4 together form an example of a session script between hand-held computer 13, Proxy-Server 19, and any WEB server 23. These figures are used herein to describe important functions of the NanoBrowser incorporated in computer unit 13, and the InterBrowser, incorporated in Proxy-Server 19, as well as to illustrate methods in practicing the present invention.

Referring first to FIG. 3, the figure is divided generally into three columns (as is FIG. 4), one for functions performed at computer field unit 13, a middle column for functions performed at Proxy-Server 19, and a third column for functions performed at WEB server 23.

At step 47 a user turns on the hand-held computer. It is assumed at this point that a data link is established between the hand-held and Proxy-Server 19, which is represented in FIG. 3 and in FIG. 4 by the boundary between the left column and the center column. As previously described, this interface can be of any convenient sort, such as an analog telephone modem. After the hand-held performs a simple boot-up process, a menu is presented to the user. One of the selections (by virtue of the NanoBrowser software) is Browse/Mail.

At step 49 the user selects Browse/Mail. Other functions of the hand-held, that may be fully supported without connection to a Proxy-Server, such as appointment scheduling and phone lists, are not represented here, except by the general step 51 labeled "Other Activity". There may be other menu selections, and the Browse/Mail selection is exemplary. Initiation of communication with the Proxy-Server could be accomplished in other ways.

Routines in the NanoBrowser respond to the Browse/Mail selection by presenting the necessary interface for the user to access his/her subscribed Internet provider. At step 53 this interface is presented and the user makes the necessary inputs to establish the provider connection.

The present example assumes connection and operation through an Internet provider, wherein the subscriber's status is that of a Proxy-Server subscriber, although this is not the only arrangement within the scope of the invention. Employees of a corporation might, for example, log on to a server on a company network.

Connection to the Internet provider is made at step 55. At step 57 action is taken to establish an Internet Protocol (IP) connection to a Proxy-Server according to the present invention. Initial communication from the connected hand-held causes the Proxy-Server to open a port and establish the connection at step 59.

At step 61 the user logs on by entering a user name and password and the field unit identifies itself with its ID. At step 63 the Proxy-Server compares the entered password and ID with stored records, and derives a signature for the unit. At step 65 the Proxy-Server decides whether the information is correct. If the Log-On is valid, control passes to step 67, and the Proxy-Server acknowledges the successful log-on to the hand-held unit at step 69. If the log-on is not valid, control in the Proxy-Server goes from step 65 to step 71, and the Proxy-Server disconnects from the hand-held unit. The Proxy-Server then waits for a new ID request (step 73).

At the hand-held unit, assuming an unsuccessful log-on, control passes from step 74 back to step 53, and the user is provided another opportunity to log on. Control continuity from the hand-held unit to further steps in FIG. 4 is indicated by line 76. For the Proxy-Server the control continuity to FIG. 4 is indicated by line 78.

Referring now to FIG. 4, which is a continuation of FIG. 3, continuity lines 76 and 78 are shown at the top of the figure. Following the activity at the hand-held, at step 79 a request is sent from the hand-held (after having been entered by the user) to access a page on the WWW. This request is represented by the URL WWW.Any.Com, which can be any valid Universal Resource Locator (URL) for the Internet.

At step 81 the Proxy-Server receives this request. The proxy server processes the request from the hand-held and at step 83 issues a new request through its own full-service browser, through its connection to the Internet, to access WWW.Any.Com. At step 85 the WWW server at WWW.Any.Com receives the request from the Proxy-Server and at step 87 sends its home page HTML file, represented as Home.HTML, to the Proxy-Server.

At step 89 the Proxy-Server receives Home.HTML. Home pages typically contain at least one image file, which in many cases is a JPG file. Accordingly, at least two files must be downloaded to display a home page. At step 91 a request for a JPG image file is sent by the Proxy-Sever. The Proxy-Server receives this request at step 93 and send the image file to the Proxy-Server at step 95. The Proxy-Server receives the image file at step 97. There may be many more files than this, but a minimum representation has been made for simplicity in description.

At step 101 the Proxy-Server converts all of the jpg files to a dithered bitmap format according to information associated with the user ID received from the hand-held at log-on. This ID establishes the size and resolution of the hand-held's display, for example, and the bitmap created from the jpg files is scaled to the hand-held's display.

Once all the files in the Home page script are downloaded from the accesses Web server at WWW.Any.Com, the Proxy-Server assembles all of these files into a single HT-Lite (HTL) file for transfer to the hand-held. This process is represented by step 103. At step 105 the new HTL file is transmitted to the hand-held unit. The hand-held receives at step 107 the single HTL file prepared from the several HTML files received by the Proxy-Server. Finally, at step 109 the hand-held awaits new user input, such as, for example, a request to jump to a related page.

As has been described above, field computers of many sorts may be used for connecting to the Internet through a Proxy-Server according to embodiments of the present invention, although there are particular advantages in using small, inexpensive, battery-powered, hand-held field units. As has also been described, information relating to the field unit used by each subscriber is recorded at the Proxy-Server (or available to the Proxy-Server), and, upon connection, the Proxy-Server accesses this information, and uses it in transposing files for a particular unit.

In some cases, a display used by a field unit will be large enough to display an entire page from the WWW. In other cases, it will be preferable to present just a part of an entire page, because the display of the field unit may be too small to provide an entire page with adequate resolution. In these cases it will be necessary to zoom and pan to see an entire page. In one embodiment of the invention a field unit is provided with an auxiliary small display, to present information relative to the position on a page that may be presented on the main screen, as an aid in panning to other parts of the page.

It is well-known that graphic information is not the only information accessible on the Internet. Audio may be downloaded in many cases as well. In many cases where audio is available, software, often termed a "media player" is provided to be downloaded from the same source to be used by the connecting computer in processing the audio data. The present structure of the Internet WWW is such that users are assumed to have certain kinds of equipment of sufficient computing power to do Web browsing and to operate media players. For example, media players are typically provided for IBM-compatible PC, Macintosh, or Sun systems.

In many embodiments of the present invention, wherein field units of much lesser power than the present assumptions may be used, these assumptions are no longer valid. Many field units which may now, with the unique capabilities of Proxy-Servers according to embodiments of the present invention, be used for browsing the WWW, will not be capable of executing the typical media players.

As has been described above, subscribers to a Proxy-Server system according to the present invention will provided characteristics of their particular field units to the Proxy-Server, and the Proxy-Server will use the information in transposing files. The same is true for audio, so the Proxy-Server will "know" if a particular field unit has a speaker system, and what the computing capability of the field unit is. In alternative embodiments of the present invention, field units will be provided with capability to receive Linear Predictive Coded (LPC) audio data, and to drive one or more speaker units. The Proxy-Server, in these cases, will either download the media players as necessary, or be previously programmed with media players, and will convert the audio data downloaded from the Internet to the form usable by the field units as a part of the overall transposing process.

In some aspects of the invention specialized field units are provided for special purposes. A hand-held computer is provided, for example, with a CPU, a ROM having embedded NanoBrowser software, a main display, and an auxiliary display for indicating page position for panning and the like. In some variations, a microphone and a speaker are also provided, and the on-board software includes routines for processing audio in both directions, to and from the Proxy-Server. In other variations a digital camera apparatus is provided with the hand-held unit, and a user can snap digital pictures and send the data to the Proxy-Server or to any other machine on the Internet by E-mail. In combinations of these variations very useful systems are provided for field operatives of such as insurance companies to do field work.

Other field units are provided in alternative embodiments as desk units for school environments, having many or all of the features of the hand-held units described, but taking the form of desktop units with conventional power supplies rather than batteries. Such units can be made with considerably lower complexity and cost than units conventionally capable of interacting with the Internet, providing much expanded Internet access for school systems and the like. These units incorporate NanoBrowsers according to embodiments of the present invention.

Another form of field unit according to the present invention is a TV-type unit having a low-end CPU and embedded NanoBrowser software according to an embodiment of the present invention. Home TV-computer technology may thus be provided through a Proxy-Server connection at a cost very much below currently available systems. Such units will also be attractive for use in hotels, as they expand on existing information systems using TV sets in hotel rooms.

In captured corporate systems, properly termed Intranet systems, scheduling, ordering, instructions, travel arrangements, and the like can be extensively interactive. For example, a secretary may access an appointment schedule file using a regular PC connected to the Internet, the schedule for an employee temporarily inaccessible (in the middle of the night in Moscow, for example, while the employee may be sleeping) and make adjustments in the employee's appointments. When the employee next establishes contact with the Proxy-Server, the appointment calendar in the employee's unit is compared by date and time stamp, and automatically updated as necessary, following preset rules for conflict resolution.

An advantage inherent in different embodiments of the present invention is that future improvements in HTML, specific WEB browsing applications, and helper applications need not be installed on the field units used in practicing the invention. Such improvements need only be made in the Proxy-Server. The Proxy-Server can also be updated to do the best translation possible for such improvements.

In an important aspect of the invention, Proxy-Servers adapted to embodiments of the present invention may be provided by commercial Internet providers, thereby providing their customers with extended functionality for small and inexpensive computer units, lowering the expense and complexity typically required of machines that may be expected to access the Internet. In this aspect, customers of such providers could browse the Internet and download and display sophisticated files with existing inexpensive portable computers, personal digital assistants, and digital organizers. This feature promises to dramatically increase accessibility to the Internet, and to lower barriers to entering the Internet world for many people who could otherwise not afford to do so.

Also in embodiments of the invention as incorporated in Proxy-Servers, caching is provided, whereby data downloaded from other Internet servers accessed according to commands entered by users in the field having units connected to the Proxy-Server, may be temporarily stored before or after translation for field units, enhancing viewing speed dramatically at the field units.

It is anticipated that one Proxy-Server may serve a large number of hand-held computers, giving each served computer a functionality far beyond what it could otherwise provide given its power and cost. Current estimates indicate that a single Proxy-Server may serve 100 or more field units simultaneously. Since statistically not all subscribers may be expected to be using their field units at the same time, one such Proxy-Server could serve perhaps 2000 subscribers.

Figure 5:
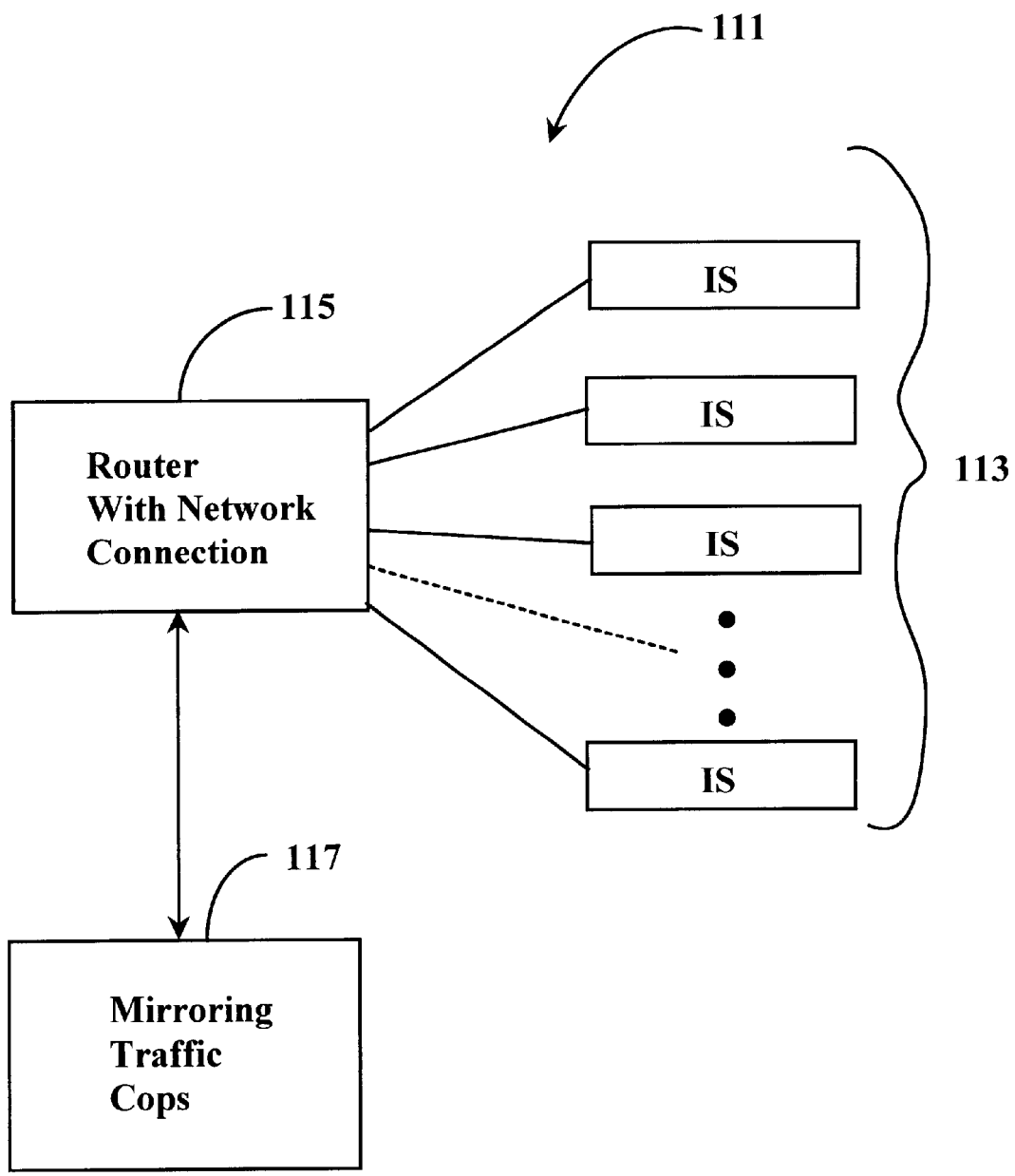
FIG. 5 is a block diagram of an Uninterrupted Matrix of Inexpensive Servers according to an embodiment of the invention.

Even though a single Proxy-Server might be expected to serve a relatively large number of subscribers at the same time, the number of potential users of such a system is very much larger than a single Proxy-Server could be expected to service. For this reason, in a preferred embodiment of the invention, an Un-interrupted Matrix of Inexpensive Servers (UMIS) is provided as a method for implementation for the Proxy Server FIG. 5 is a block diagram of a UMIS system 111 wherein relatively small, inexpensive servers 113, each with its own hard disks, are interconnected in a network protocol with a router 115 and a mirroring traffic cop server 117. Such a system can handle massive numbers of requests, at a moderate cost, and the system and is scalable and to a high degree fail-safe.

An incoming request is directed to the traffic cop, which is a mirroring system, so that in case one unit fails, the other can take over without interruption. The traffic cop determines that availability and load of all IS's on a regular basis by connecting a requesting a load number (timeout is regarded as failure of that IS), so it can direct requests to the lowest loaded IS. If an IS fails, the traffic cop will learn of it at the next round, and can notify a system supervisor. The load is then shared between the remaining units. Also, a failure of one of the mirroring units triggers a notification to the supervisor. An escalation can be added via e-mail and pagers until proper action is taken.

Ideally the IS units are like drawers that fit into a rack, and have a red light that goes on when and if they fail. This way, service personnel can see immediately which unit needs to be exchanged.

Since there is only transitory data on hard-disks of the IS's, no data recovery is required. In case of open connections, the client's TCP/IP protocol will retry after a time out, and will be directed by the cop to a new IS, thus recovering completely transparently. This way cost per subscriber can be held very low. On the Cop units, since they are mirroring, after an exchange of a defective unit a software routine is started that reconfigures the new unit to be synchronized.

Figure 6:
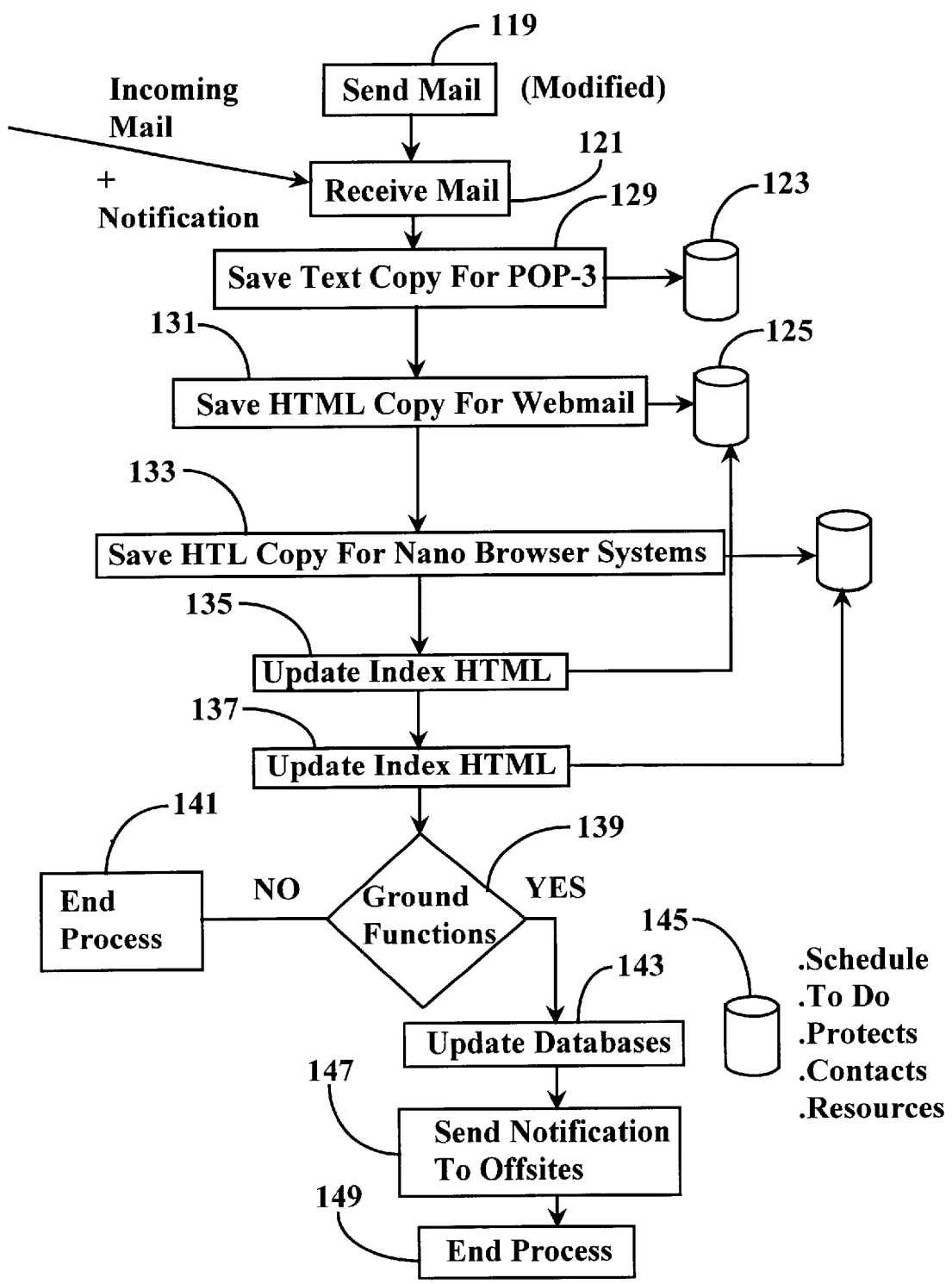
FIG. 6 is a flow diagram illustrating enhanced E-mail and groupware functions according to an embodiment of the present invention.

As was described above, in systems according to embodiments of the present invention, many database functions can be shared with entries, edits and updates made over Internet connections. In addition to database functions, systems according to embodiments of the invention can accomplish enhanced E-mail functions. FIG. 6 is a flow diagram illustrating the nature of such functionality.

The functions illustrated by the flow diagram of FIG. 6 are accomplished by executing software either on a Proxy-Server or at a separate mail server which may be accessed by a Proxy-Server according to an embodiment of the present invention. The routines depicted here are a modified version of SendMail routines known in the art.

In FIG. 6 events for purposes of description begin at step 119. Modified SendMail is active. At step 121 incoming mail is received. In this modified system, there are three file systems 123, 125, and 127 for storing E-mail in different versions. At step 129 a text copy is saved in file system 123 according to Post Office Protocol, revision 3 (POP-3 format, known in the art. At step 131 a copy of the received E-mail entity is saved in HTML format, for WEB mail. At step 133 a copy of the entity is saved in HTL format, compatible with the communication protocol for HT-Lite used between a field unit and a Proxy-Server in embodiments of the present invention.

At step 135 an HTML index is updated. At step 137 an HTL index is updated. At step 139 a discrimination is made as to whether data received is flagged to update a GroupWare database. If not, the process ends at step 141. If so, the appropriate database is updated at step 143 in file system 145. Examples of such databases are an appointment schedule, a ToDo list, a project file, a contacts file, and resumes. There are many more databases that might be updated as well. At step 147 notification of changes in a database are sent to appropriate offsite addresses. The process ends at step 149 until another E-mail message is received.

In the manner shown, E-mail may be shared in the conventional POP 3 manner, sent as HTML with a WEB page, or sent over a TCP/IP pipe as an HT-Lite file directly to a field unit having a NanoBrowser according to the present invention. Moreover, the Internet links may be used to manipulate the scheduling and other GroupWare functions described. Also, the technology disclosed here relative to E-mail and GroupWare functions can be applied to other massive server functions; it is not limited to the Proxy-Server of the present invention.

In another aspect of the present invention the objectives of the invention may be met without the necessity of having a proxy server between the user's device, such as a hand-held personal computer, and other servers on the world-wide web (WWW).

As was described above in descriptions of some preferred embodiments of the present invention, the unique proxy server accomplishes certain translations and processes that allow quick and efficient integration of data with a user's device. The proxy server, in a preferred embodiment first processes data requested to be transmitted to a specific user's device according to pre-stored characteristics of the specific user's device, or according to characteristics transmitted by the user's device. For example, graphics are processed to provide specific resolution and size according to the specific user's display. Also only multi-media extensions supported by the user's device are used, and data is preferably combined into one file for each transfer. In this manner, each communication with each user's device is done in a fast and efficient manner, tailored to the needs of each user, and the user can then function with a minimum hardware/software device that may be energy efficient providing long life between battery charges.

Figure 7:
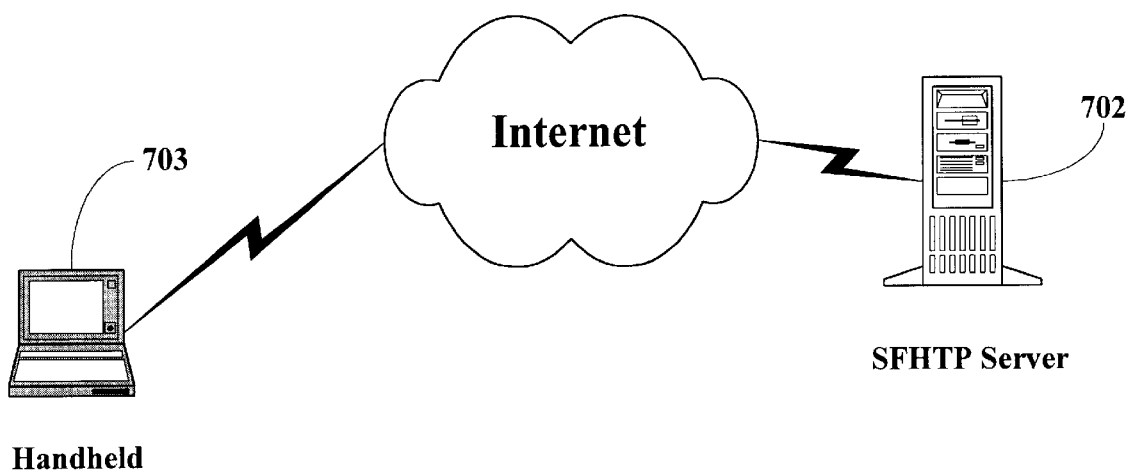
FIG. 7 is an overview illustration of a WEB-browsing system according to an embodiment of the present invention wherein a proxy server is not used or needed.

FIG. 7 illustrates an architecture for a system according to an alternative embodiment of the present invention. In this embodiment there is no intermediate proxy server as was described above in other embodiments of the invention, but a server 702 capable of conventional HTTP or HTTPS communication is enhanced to provide an alternative Simplified File Hyper Text Protocol (SFHTP) capability, and this server may then communicate over the Internet with hand-held computers 703 in a manner to significantly enhance communication speed and efficiency. The difference between a conventional server and an SFHTP sever according to this embodiment of the present invention is in the control routines.

Figure 8:
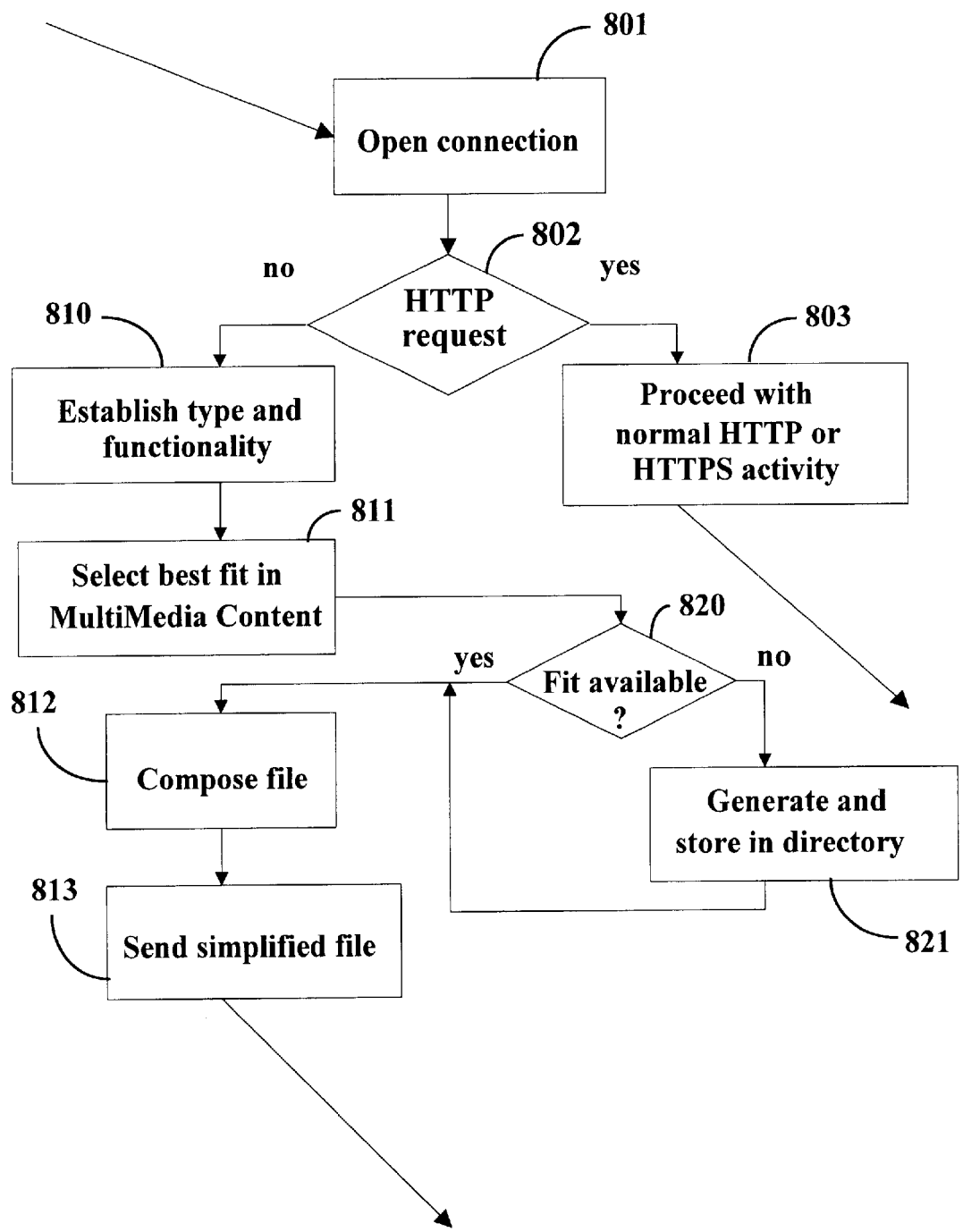
FIG. 8 is a flow diagram illustrating steps in process flow for operations of a server according to an alternative embodiment of the present invention.

FIG. 8 is a process flow diagram illustrating steps followed by a SFHTP-enhanced server according a preferred embodiment of the present invention. A request for service is received at step 801 by a Web Server enhanced according to an embodiment of the present invention. At step 802 the server, through its on-board CPU examines the request. If the request is a conventional HTTP or HTTPS request, control goes to step 803, and processing is according to conventional routines as provided for any conventional HTTP request. If the request, however, is a unique SFHTP request according to an embodiment of the present invention, control is passed to a unique set of control routines beginning with step 810.

The request received may be from a subscriber for SFHTP services or from a conventional subscriber. The difference for a SFHTP subscriber may be accomplished in a number of ways. For example, the request may be tagged by a single additional bit or character, or several additional data bits, in a manner that a conventional server (not enhanced for SFHTP services) will simply ignore or error flag the request. An SFHTP subscriber's usually minimally capable device may proceed to interact with the conventional server, albeit at a greatly reduced speed and with minimum features.

If the request is found at step 802 to be a SFFTP request, at step 810 the type and functionality of the user's device is established. As described above, this may be by matching an ID provided in the request with a list of functionality and characteristics previously provided by the user and stored at the enhanced server, or an interaction may be established wherein the user's device transfers the list of available features to the enhanced server. The list of available features can include such things as screen type, size and resolution; sound options; telephony; credit capabilities (card readers); media players; and the like.

At step 811 the control routines of the enhanced server begin to create the best fit in multimedia content for the requested data according to the user's device capabilities and characteristics. This process includes step 820 wherein the system of the invention determines if a best fit is immediately available. If so, control goes on to step 812. If not, in a preferred embodiment a best fit is generated and stored at step 821, and then control passes on the step 812. In step 821 a graphic is created having the size and resolution of the requesting user's display, and that picture is stored for future use. If the same user or a user having a device with the same display characteristics later requests this picture, it may be retrieved and sent immediately without the need for generating the best fit.

At step 812 a single file is composed using the requested information processed according to the best multimedia fit for the user's device. That file is then transmitted to the user at step 813. Just as described above for other embodiments of the present invention the file transmitted to the user is attuned exactly to the user's needs, and may be directly displayed without heavy software overhead at the user's device, thereby enabling the user to maintain a minimally-configured and powered device.

The single file transmitted to the user contains the data for the static part of a WEB page to be displayed. It may still contain animation, but no new data. It may contain information on opening connections for continuous data type operations, such as telephony, broadcast, video, virtual reality, and so forth. After the file is sent the instant session is terminated. Eventually opened communications may stay open however, until they are closed by either the user of by the server.

It will be apparent to those with skill in the art that there are many variations that may be made in embodiments of the invention as described above without departing from the spirit and scope of the invention. There are, for example, a wide variety of ways different programmers might arrange code to accomplish the purposes described for the invention. Such differences in code do not necessarily constitute distinguishable variations because it is well known that the same results in function, hence method of application, may well be accomplished by a variety of code and/or system arrangements. The range of functions provided at a field unit may also vary widely in different embodiments of the invention, and there are, as described above, many sorts of computer units that will qualify as field units in cooperation with a Proxy-Server according to embodiments of the invention. Other variations within the scope of the invention include hardware variations.

Peripheral Devices and Computerized Appliances

The apparatus and methods described above create virtual bandwidth for client devices, such as the hand-held computers used in various examples of practicing the invention, by reducing the data content needed to address the needs of the client devices. The hand-held computers used in various examples as the client devices, however, are but a single example of client devices that will benefit from embodiments of the present invention. As development of the Internet and other wide area network solutions continues, more and more devices are being provided for specific uses, incorporating computer elements and an ability to communicate with remote data sources. These products include WEB TV devices, set-top boxes, audio and video players, and devices newly adapted to operate as computer peripherals. New abilities for rapid transfer of applications and data make such products practical, and the present invention, by multiplying the apparent bandwidth for data from remote sources (Internet for example) will accelerate this process.

Products and systems that may be clients for proxy-server operation in embodiments of the invention as taught above may be roughly divided into two classes. First are those that are adapted to communicate with the Internet (or other WAN) directly, such as the hand-held computers described above, and devices like WEB TV systems, Set-Top boxes, and the like. Secondly there are many existing devices, and more devices being developed, that may communicate locally with a computer or computerized appliances which may in turn communicate with remote data sources over networks like the Internet. A device adapted to communicate with computers locally, acting as a computer peripheral device, for example, may benefit as a client indirectly, with the host device accessing the Internet or other WAN, downloading data specifically reduced in data content according to characteristics of the peripheral device, and then communicating the data to the peripheral device.

PC Peripheral Interactive Systems and Clients

As an example of peripheral devices that may benefit from the ability of systems according to embodiments of the present invention to deliver data from remote sources in a form adapted to characteristics of the end-using device, a PC peripheral interactive doll is described below, the details drawn from the priority document introduced as application Ser. No. 08/606757 above.

Overall Aspects of Interactive System

Figure 9:
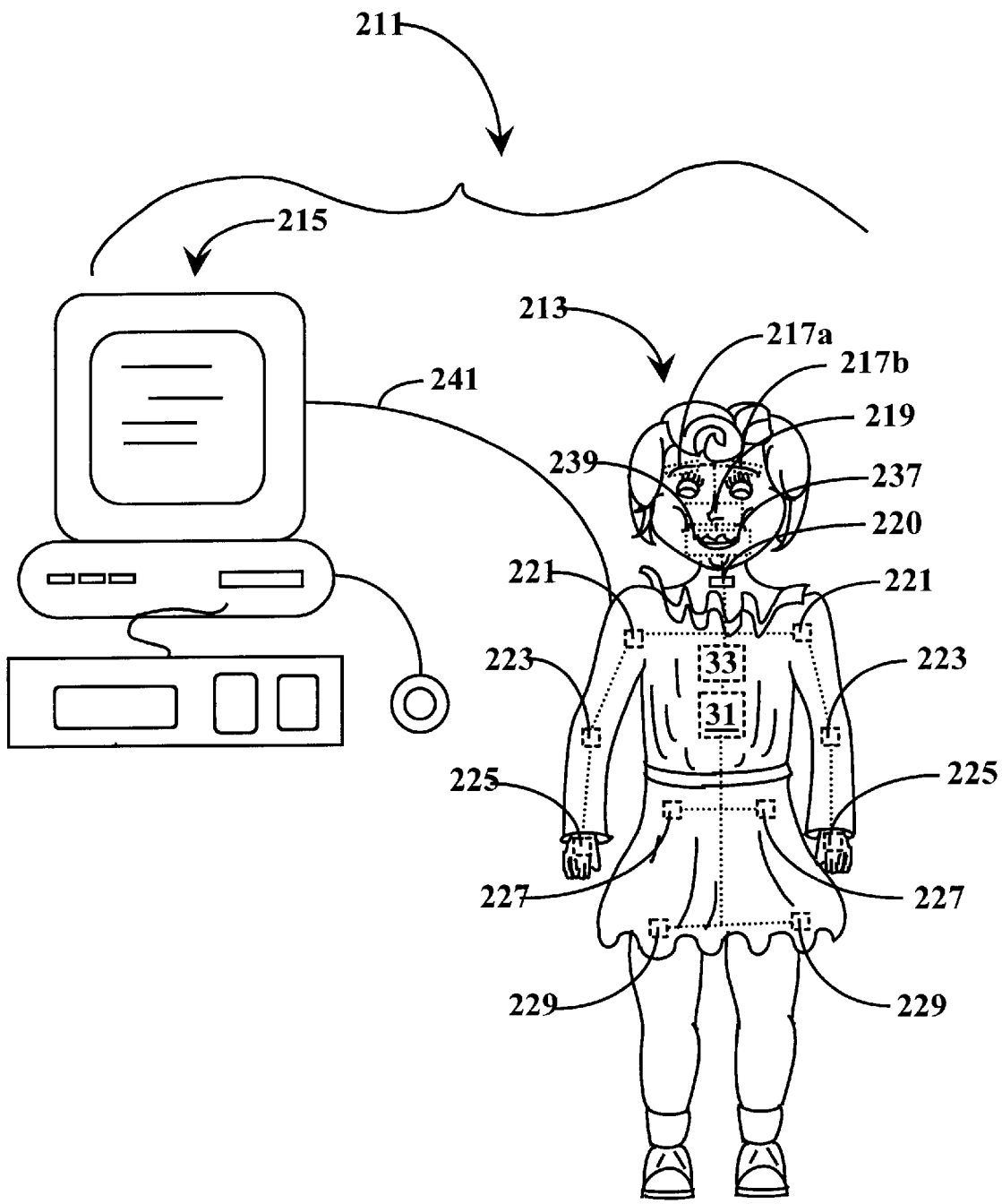
FIG. 9 is a mostly diagrammatical illustration of an interactive doll system according to an embodiment of the present invention.

FIG. 9 is a mostly diagrammatical illustration of an interactive doll system 211 comprising a doll 213 adapted for bi-directional communication with a PC 215 and for interactivity with a person, in an embodiment of the present invention. This unique arrangement provides a doll that is relatively inexpensive for the capability it may exhibit, void of very delicate, relatively expensive mass-storage devices such as hard disks and CD-ROM drives, and yet capable of virtually unlimited interactivity with a person.

PC 215 in a preferred embodiment is a high-end PC with a state-of-the art CPU, a CD-ROM drive, a windows-type operating system, a high-speed modem, and Internet browsing software, and a high-capacity hard disk drive. Exactly these characteristics, however, is not a specific limitation on the invention, as many sorts of PCs exhibiting a broad range of capabilities might be incorporated. In some embodiments no mass storage device is needed, and all control routines and data are imported from remote locations. In other embodiments, control routines are provided by tape, CD-ROM, and the like. In various embodiments, capabilities of a system 211 will be a function of the capabilities of the host PC, among other things.

The shape of doll 213 is somewhat arbitrary. Dolls of many different shapes, sizes, ethnic attributes, and the like may be used, and clothing and accessories for the doll may be as varied as is commonly seen for commercially-available dolls. Moreover, it will be clear from descriptions that follow, that a doll shape is not required for practicing the invention. Other entities may be used in alternative embodiments, such as animal caricatures, robot-like entities, even toys such as toy automobiles and the like. The example of a doll, however, is convenient for conveying many aspects of the invention.

Also, the power of state-of-the art PCs is such that multiple entities may be managed by a single PC, and in some cases separate entities may be managed simultaneously, and there may be interaction between the managed entities; between two separate dolls, for example, or between a managed doll and a toy car or other entity.

Doll 213 in FIG. 9 is a self-contained mechanism comprising both sensors for touch, temperature, and movement; and activators, such as solenoids and motors connected to mechanisms to provide movement of various parts of the doll. servo-mechanical systems 217a and 217b provide eye movement; servo-mechanical system 19 provides mouth movement; servo-mechanism 220 provides movement of the head in multiple axes; servo-mechanisms 221 provide shoulder articulation; servo-mechanisms 223 provide elbow articulation; servo-mechanisms 225 provide hand and wrist articulation; servo-mechanisms 227 provide hip movement; and servo-mechanisms 229 provide knee articulation. It will be apparent to those with skill in the arts related to robotics that there are many electro-mechanical systems known that can be applied to provide movement to the doll and other entities that might be used in other embodiments.

In addition to the servo-mechanisms described above, doll 213 has a speaker 237 for providing speech and other sound effects for the doll. Speaker 237 is coupled to the power and control system in a manner described more fully below. A microphone 239 for audio feedback is also provided, and coupled to power and control system in the doll also in a manner more fully described below.

Specific sensors are not shown in FIG. 9, but many sorts may be used in various embodiments. For example, an acceleration sensor may be incorporated in the system and set to a threshold to monitor rough movement, such as falling to the floor. Rapid deceleration in such a case could be used to trigger a response from the doll, such as an admonition to be careful and not to play too rough. Other sensors may be used for temperature, and the doll may respond, through processed to be described below, with indications of comfort or discomfort. Tactile sensors may also be used, so touching a doll in different places and in different ways may elicit appropriate responses as well.

Doll 213 in FIG. 9 has electronic control circuitry 231 for managing functions of the doll, and for coordinating input from sensors and output to electro-mechanical systems. The control circuitry includes a microprocessor, a memory, digital sound circuitry, and interface circuitry for operating the various servo-mechanisms that provide movement of the various moveable portions of the doll. Input/Output (I/O) interfaces for switching power to servo-mechanisms via logic-level, computer-generated signals are well known in the art.

Power supply 233 may be any of a number of storage and rechargeable power systems suitable for the power requirements of such a doll. Many sorts of storage power supplies are known in the art and would be suitable for powering such an electro-mechanical doll. In some embodiments storage cells are used, in others, rechargeable batteries such as those used for cellular phones and cordless power tools are incorporated. In some embodiments, power is provided from outside the doll by a tether or other connection to an external power source.

In addition to the control, sensing, speech and other audio output, and servo-systems briefly described above, doll 213 in interactive doll system 211 has a communication link to host computer 215. In one embodiment the communication link is a serial link to an industry-standard serial port at the computer. In another embodiment, the link is a parallel link via a standard or enhanced parallel port. In other embodiments the communication link is a cordless link, by any of several well-known methods, such as, for example, RF broadcast, UHF broadcast, infra-red, fiber-optic, inductively-coupled, and so forth. In FIG. 9, a cord-type communication link 241 is indicated. Cord or cordless links may be implemented by a number of different protocols, including among others, standard serial port (SSP), standard parallel port (SPP), by audio analog from a sound card in the host, by a special device as an add-on card to the host, by a soon-to-be available Universal Serial Bus (USB) developed by a computer-industry consortium, and others.

Doll 213 is an interactive peripheral device to host computer 215 in interactive system 211, a computer peripheral in words of the art. It is by the communication link that doll 213 attains access to the full computing and data power of host 215. In a preferred embodiment, as described briefly above, the host computer is a state-of-the art PC having both a high-capacity hard disk drive and a CD-ROM drive, as well as a powerful CPU, such as one of the Intel Pentium™ CPUs available at the time of this specification. The choice of communication link is driven by, among other factors, the sophistication of doll 213 and host 215. If both are relatively sophisticated, a higher speed and broader-band link is desirable, because the data flow will be more robust. In less sophisticated systems, slower and less-broad links are indicated.

In various embodiments of the present invention described herein, just as most computers may support two or more peripheral devices, a state-of-the-art PC has sufficient power to support two or more interactive dolls or other interactive entities simultaneously and in substantially real time. Several dolls may be thus supported and operated from the same software script. In embodiments described, it is thought sufficient to describe one such doll in each embodiment.

By the fact of the peripheral connection, interactive doll 213 acquires all of the considerable computing and data power of the host. In alternative embodiments, wherein the host has an appropriate analog or digital telephone modem and Internet operative software, the doll acquires in addition access to numerous stores of data from all over the Earth. The doll as a computer peripheral becomes a doll with aptitude and attitude.

More Detailed Structure of Doll and PC

Figure 10:
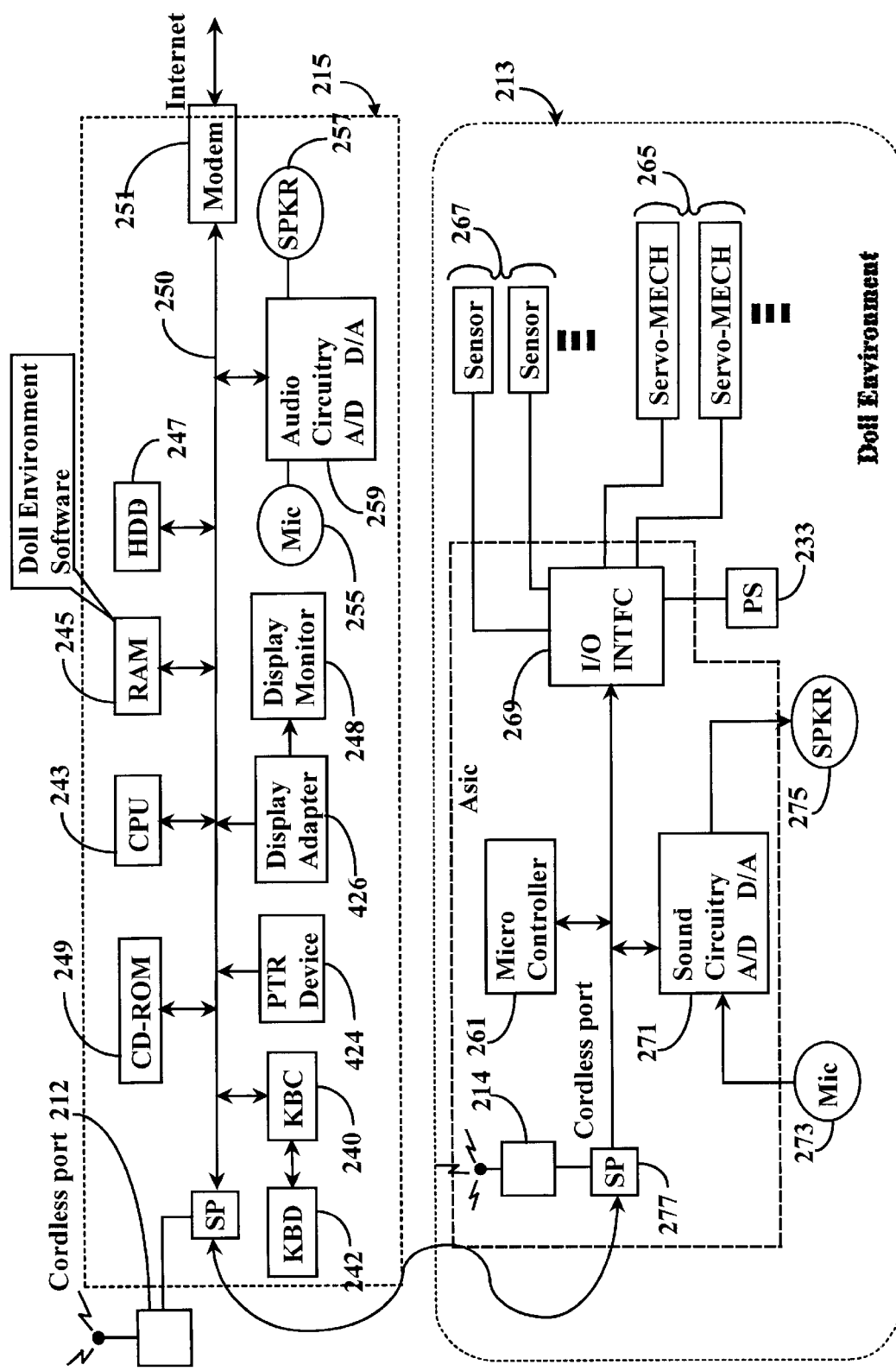
FIG. 10 is a more detailed diagram of control and power systems in the interactive doll system of FIG. 9.

FIG. 10 is a diagram of control and power systems in both host computer 215 and doll 213 of FIG. 9, including alternate communication links between the two, in more detail than is shown in FIG. 9. PC 215 is, in its hardware-only aspects, a conventional PC, comprising among other hardware components a CPU 243, random-access memory (RAM) 245, a hard-disk drive (HDD) 247, and a CD-ROM drive 249. Communication between the components is via bus structures 250. It will be apparent to those with skill in the art that in state-of-the art PCs bus communications can be more complex than shown in FIG. 10, including local buses, peripheral buses, and the like, with connecting chip sets. Bus structure 250 is meant merely to represent any conventional sort of bus arrangement between well-known components.

In addition to internal components, PC 215 has also a keyboard controller (KBC) 240 and a connected keyboard (KBD) 242, a pointer device 244, a display adapter 246, and a display monitor 248, as is known with most state-of-the-art PCs.

As explained briefly above, a high-end PC is preferred to provide computing power and mass-storage capacity for relatively sophisticated interactive doll applications, but less powerful systems may be utilized for less sophisticated applications. In practice, if a customer for such a doll has already a computer in the home, he or she may purchase a doll and control routines to match the capacity of the already-available PC.

PC 215 has also in this embodiment a microphone 255 and a speaker 257 with appropriate audio circuitry 259 providing analog-to-digital and digital-to-analog conversion for audio communication with an operator at PC 215. Devices known as CODECs are commercially available for this function. There is also a modem 251, which may either of an analog or digital type, such as an Integrated Services Digital Network (ISDN) interface, and also resident software for Internet access and browsing. PC 215 has also a serial port 253, which in this embodiment is used for communication with doll 213 over serial communication line 241.

Control circuitry 231 introduced above in doll 213 is indicated in FIG. 10 in additional detail. The outer aspects of the doll are indicated only by a dotted area in FIG. 10, but it should be understood, as briefly explained above, that many sorts of dolls with many kinds of clothing and decorations may be used. The environment is not limited to dolls, either, and other entities may be used, depending only on the imagination of suppliers of control environments for such interactive entities, as is described in more detail below.

Management functions are provided by a microcontroller 261. The microcontroller has on-board registers providing a minimum buffer capability for data stream from PC 215 in operation in many embodiments. In some embodiments there may be other storage capability, but it is preferred that as much functionality as possible be provided by PC 215, keeping doll 213 cost effective. Digital components are shown connected through a bus structure 262 in FIG. 10, which, as for PC 215, represents any of a variety of buses and combinations of buses that might be used. In doll 213, however, it is preferred that as many of the digital functions as possible be provided on board a single ASIC chip, so bus communications will be, in most embodiments, an on-chip function.

Doll movement of various sorts is provided by servo-mechanisms 265, representing the several servo-mechanisms described above for head, eye, hand, arm movement and so forth. As described above, different embodiments of interactive dolls according to the invention may have different sets of servo-mechanisms, and more or less sophisticated movement abilities.

Feedback for range and speed of movement of doll parts and the like is provided by sensors 267 associated with servo-mechanisms 265. Such sensors, which may include optical sensors, trip switches, proximity sensors and so forth are well-known in the arts of machine control and robotics, and need not be described in detail herein. Sensors 267 are meant to represent also stand-alone sensors for such as local temperature, pressure. tactile sensations and so forth for doll 213, and may or may not be used, depending on requirements of specific embodiments.

Both sensors 267 and servo mechanisms 265 are interfaced through an I/O interface 269 connected to power supply 233 and controlled by digital signals provided on bus structure 262. Such I/O interfaces are well known in the arts of machine control and robotics, and are familiar to those with skill in these arts. Many or all of these I/O functions may also be provided on the same ASIC chip comprising microcontroller 261.

Digital signals are decoded by I/O interface 269 to switch power from power supply 233 to various of servo-mechanisms 265 for producing doll motion, and motion is monitored by various of sensors 267. Input to I/O interface 269 from sensors 267 are provided to microcontroller 261 as digitized signals, and used by control functions for control of doll motions.

Doll 213 also has sound circuitry 271 interfacing a microphone 273 and a speaker 275 to bus structure 262 and microcontroller 261, whereby the doll may speak to a child or other person, and the child or other person may speak to the doll and have verbal communication digitized and provided to control systems in the doll and the PC. As described for PC 215, the sound circuitry may be provided by a commercially available CODEC.

There is also a port 277 connected to bus structure 262 in doll 213, in this embodiment a serial communication port, for communication with PC 215. In a preferred embodiment this port and its digital circuitry are integrated with the ASIC of the microcontroller and other digital components. Port 277 in doll 213 and port 253 in PC 215 are connected by serial line 241, providing serial communication between the doll and the PC.

In alternative embodiments communication is provided in a manner other than by a serial communication line 241 as shown in FIG. 9 and FIG. 10. Cordless communication is preferred in many embodiments to provide freedom of movement for the doll and person with the doll, and for safety for young children. With appropriate circuitry communication can be by infrared code, by inductive coupling, and by broadcast links of several types. In one embodiment cell phone circuitry is utilized to provide communication between the host and the doll. Cordless communication interfaces 212 and 214 in FIG. 10 are meant to encompass the several types of cordless communication that might be used.

In some embodiments using broadcast communication, maximum freedom of movement is provided by having relay station capable of receiving, transmitting and amplifying communication signals. Relay stations may be provided, for example, throughout a home or building, with a single PC at one location, so a cordless system with limited range may cover a much broader area.

In the general arrangement shown, the doll is a peripheral device to the PC, having two-way communication, and the considerable power of the PC, including data and control routines from HDD 247 and CD-ROM drive 249, as well as data and routines available from the Internet, is made available to the interactive doll. With such computing and data power, a truly interactive and realistic doll may be provided, and there is potentially no limit to the data and personality structures available to doll 213.

Generalities and Specifics of Operation

In one preferred embodiment an operating system for doll 213 is provided on a CD-ROM disk, which, in the current state-of-the-art has the several hundred megabytes of capacity needed for full functionality of such a sophisticated interactive doll. In its outer aspects a doll 213 would be sold as an identifiable entity with integrated clothing and accessories, much as conventional dolls are sold today. Dolls may thus be provided in a broad range of ages, races, cultures, and the like, to suit the needs of many potential users. An individual doll may also have a name, or be named by the purchaser, and a limited range of clothing and accessories may also be provided with the doll.

A doll will be provided with all necessary interface hardware, which, in the case of a serial connection with a tether, will amount to the tether connected to or connectable to the doll and to a serial port of a host computer.

Also provided with the doll will be one or more CD-ROM disks for loading on a PC as well as instructions for connection and initialization. The CD-ROM provides the operating environment for the doll, to be loaded on the host PC and executed by the host CPU, and a complete interactive software system for the doll. The CD-ROM can provide one or more personalities for the interactive doll, for example, and completely scripted environments. Third party suppliers will be encouraged to provide environments and personalities of many different sorts for many different purposes.

When doll 213 is connected to host 215 and properly configured, one simply inserts the appropriate CD-ROM disk in drive 249 and boots the environment program on the disk. Depending on the environment, there may or may not be an accompanying interactive display.

Figure 11:
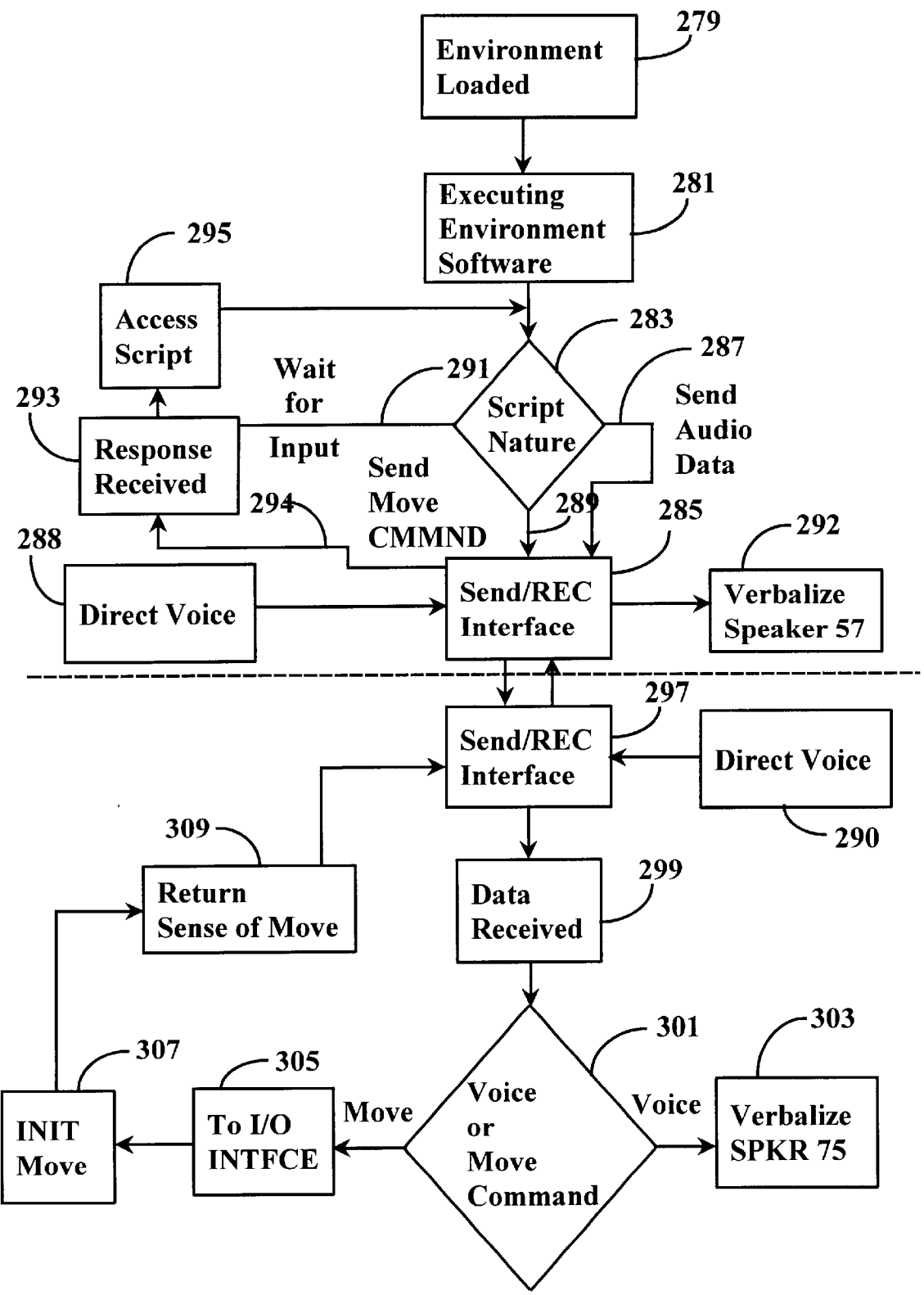
FIG. 11 is a generalized flow diagram of data flow and response in the interactive doll system of FIG. 9.

FIG. 11 provides a generalized flow diagram of data flow between host 215 and doll 213, and general operations on each side. In FIG. 11, at step 279 the environment software is loaded from a CD-ROM for execution. At 281 CPU 243 is executing environment software. As each line of script in execution is executed, at step 283 the nature of the script is determined. If the script is for sending voice, a predetermined voice packet is sent (path 287) to the host send/receive interface 285 for transfer to the doll over the communication link. Interface 285 can be any of the interfaces indicated as 253 and 212 in FIG. 10, and described above relative to FIG. 10.

In some embodiments direct voice communication is allowed from a microphone in the host to the speaker in the doll, and this direct voice feature is represented as beginning at step 288, which bypasses other controls. Voice input in this case passes from microphone 255 (FIG. 10) through audio circuitry 259. Audio data goes to the doll via link 241, and is converted again and output at doll speaker 275, step 303 in FIG. 11.

In these embodiments direct voice is also enabled between the doll and the host. This feature is presented as beginning at step 290. Voice input passes from microphone 273 in the doll, through circuitry 271, is passed to the PC via line 241, and directed to circuitry 259, then speaker 257, represented as step 292 in FIG. 11.

If the script is for movement of the doll a movement command is sent to interface 285 (path 289) for transfer to the doll over the communication link. Some scripts require a specific input from the doll (path 291). If at step 293 the awaited input is received, control proceeds to a new line of script at step 295, directed by the response. One example of prompted response is return of a sensor limit after a directed movement of a portion of the doll. Sensor return is not always required, however. Some movements are timed, and others are simply repetitive. Another example is an expected voice response after a voice output to the doll. In a teaching activity, for example, the host might ask a question, await a voice response, decode the voice response, and proceed accordingly.

In some applications, script is provided to link microphone 255 in host 215 with speaker 275 in the doll. The linkage is, of course, indirect, in that the voice input at the host is digitized, sent to the doll, then converted again to analog form for voice output. In this manner, a parent, a behavioral specialist, or other operator at a computer may speak to a child through the interactive doll in substantially real time, and through microphone 273 at the doll, the child may respond in substantially real time. The doll becomes, in this application, a surrogate for the computer operator. A child, who may not interact directly with an adult, might very well interact responsively to the doll.

On the doll side of the system, send/receive interface 297 represents either of port 277 and cordless interface 214 in FIG. 10, in any of the various forms described above. Step 299 represents data packets received from host 215. At step 301 the nature of data packets, voice or movement, is ascertained. If voice, data is directed to step 303 where the data stream is converted to audio voice via speaker 275 in the doll.

If the data is determined to be for movement, the data stream is directed to step 305 (I/O interface 269) and movement is initiated at step 307. At step 309 a completion signal or other sense of the directed move is returned to interface 297 for transfer to host 215. In embodiments using a microphone 273 in the doll, all voice picked up at the doll is transferred to the host, and the host discriminates by means of scripted function to respond to such input. Most input elicits no response or new commands from the host. The host, as described above, in some instances seeks audio response, and in these instances is enabled to direct continuing interaction on the basis of receipt of a response. Path 294 in FIG. 11 represents responses to the host from the doll environment, which may be voice or of other nature.

As described above, FIG. 11 is meant to represent general data and command flow in the system of the intercommunicating doll and host. It will be apparent to those with skill in the art that there are many alternatives to this diagram, and that actual communication and action is managed by CPU 243 in the host and microcontroller 261 in the doll.

Some scripted programs provided by CD-ROM provide an interactive interface on display monitor 248 at host 215, and others do not. In some instances the operation of the doll system is in the background and transparent to a user of the computer, who may be using other applications, such as a word processor or Internet browser. For example, a CD disk may be provided with stories, poetry, nursery rhymes and the like for a child, the material to be spoken to a child by the doll, prompted by the child. In this embodiment the child may request a particular selection, wherein the system may key on a word or combination in the child's spoken request, and track to that selection and recite the wanted selection. Other interactivity may be provided, such as a repeat request by the child causing the system to back up some predetermined time in the selection being played, and restart.

An application of this sort needs no display or input from an operator at the computer host. Most state-of-the-art computers are sufficiently powerful to operate such a system transparently, and still operate another application for a user.

Another useful embodiment that may operate transparently is an embodiment that simply recites selections to a child in a foreign language, that is, other than the child's native language, perhaps providing time between some words for the child to repeat words or phrases. The simple recitation is known to provide mental associations for a child in preparing the child to deal with the language at a later time.

An example of an embodiment utilizing an interface on display monitor 248 is an embodiment wherein interactivity may be altered or programmed by selection and input at the host. Some interactive applications on CD-ROM may have alternative scripts at alternative portions in a single script. A menu interface in these cases is presented on the display monitor enabling a user at the PC to select alternatives.

In some embodiments, programming may be done at an interactive interface on display monitor 248. A parent may, for example, in some embodiments, record messages and stories for a child, which than become a part of a script for interactivity between the child and doll 213.

It was described above that use may be made in some embodiments of modem 251 with Internet access software and browser software. In one embodiment, the modem connection may be used to connect two hosts each having loaded routines to interact with a doll 213 (two dolls at two different locations, which may be any distance apart). A link is established in this embodiment between a child at a first location, through a doll to a host PC at the first location, to a PC at another location, and from that PC to another doll to another child. The two children may then interact through the two dolls.

It will be apparent to those with skill in the art that there are many uses for such a powerfully interactive doll or other entity, having all of the capability of a state-of-the art PC. Uses have been described for educational purposes, for behavioral science (a child psychologist may use such a doll to interface with a child patient), for language familiarization and instruction, for games, for storytelling, and for many other purposes. As described briefly above, third party suppliers are to be encouraged in the practice of this invention, to prepare scripts for many purposes for persons having dolls and computer hosts according to various embodiments of the invention. Every new script provides a new embodiment of the invention.

It will also be apparent to those with skill in the art that there are many alterations that might be made in both hardware and control aspects in embodiments of the invention described herein without departing from the spirit and scope of the invention. There are, for example, many ways the electronic circuitry, the servo-mechanical mechanisms, and the communication elements in the doll might be implemented. Some dolls within the scope of this invention might have simply two-way voice communication with a host, while others may have very extensive robotic systems and sensors. Similarly software aspects may vary widely. Software is an art as much as a science, and many programmers have personal preferences for code sequences and the like to accomplish similar ends.

Non-Screen Appliances

It will be apparent to those with skill in the art, having read the above teachings, that a host computer, enabled to interact with a PC peripheral interactive doll or other interactive appliance, may also be enabled to interact with a remote proxy-server on a wide area network such as the Internet, using a form of the disclosed NanoBrowser, and hence to communicate with the remote server in the fashion disclosed above, wherein information coming from the remote server to the host computer is translated to a reduced-content form according to characteristics of a device to be served. In the examples provided above of a hand-held computer as client, the information from a remote host is reduced in content according to characteristics of the display of the hand-held computer. Display characteristics, however, are but one example of a parameter which may be used to reduce data magnitude and hence provide a virtual bandwidth enhancement. Other parameters may be used. The PC peripheral interactive doll, for example, has no screen, and may be enabled to use only audio or text data from a host, for example. The doll in this instance is an example of a non-screen appliance. Data sought from a remote server for use with such a doll need not have display content at all, but only the audio or text portions of available data. Text may be converted to speech at the host of the doll itself.

There are many computerized non-screen or small screen (like 1–2 lines text only) appliances that might benefit from data transfer from remote sources according to embodiments of the present invention. Some of these devices, like the PC peripheral doll, may be served by a PC or other computer which also accesses the Internet or other WAN and operates with a proxy-server according to an embodiment of the present invention. Other non-screen appliances may be directly connectable to the Internet or other WAN.

Figure 12:
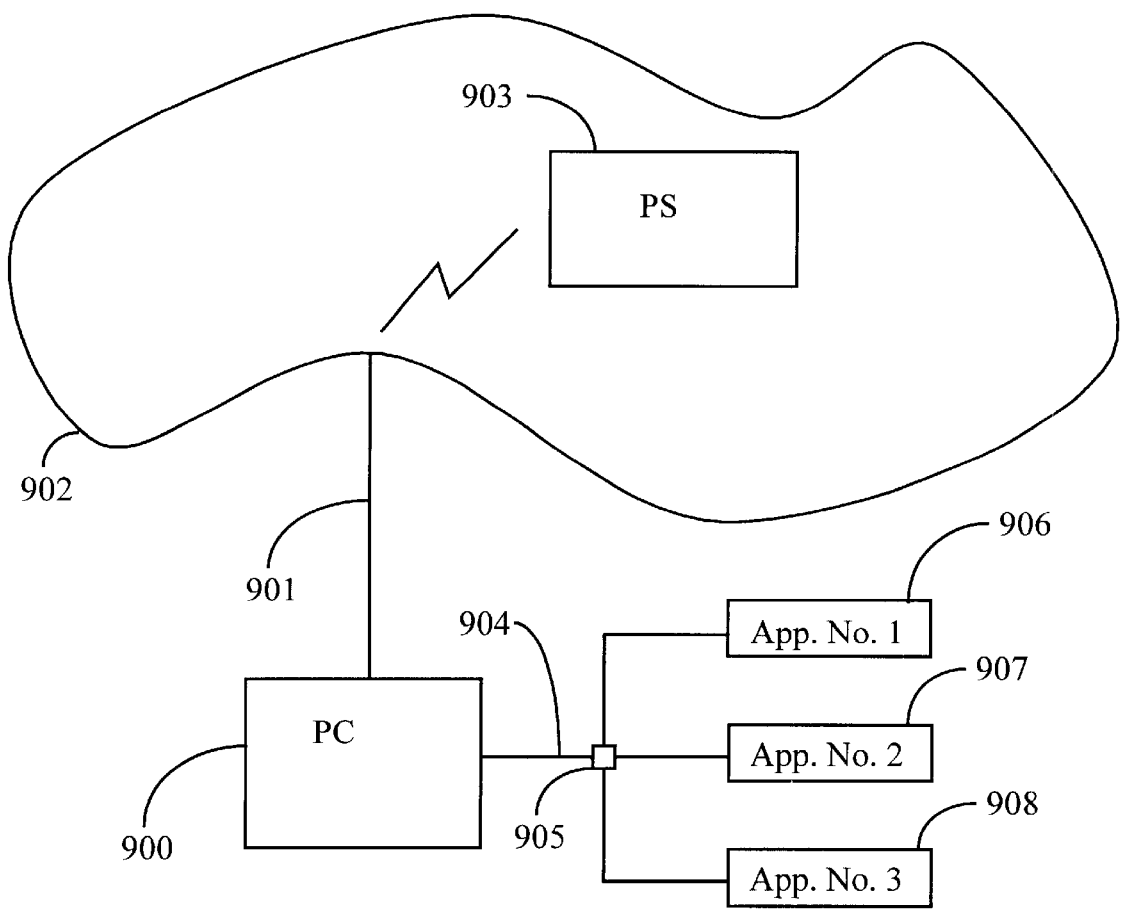
FIG. 12 is a block diagram of a host PC connected to an Internet source and to a plurality of appliances in an embodiment of the present invention.

In the case of a host connected to the Internet or other WAN and enabled to communicate with a proxy server according to an embodiment of the present invention, such a host may be in turn connected to several peripheral devices. In this sense a host may serve several interactive devices, providing data to each from a remote server. FIG. 12 is a block diagram illustrating just such an arrangement.

FIG. 12 shows a PC 900 connected by a data link 901 to a WAN 902 such as the Internet, and a proxy server 903 in network 902. PC 900 also has a Universal Serial Bus 904 with a bus node 905 connecting the PC to three peripheral devices 906, 907, and 908. The peripheral devices can be any of several sorts including displays, intelligent units having displays, non-screen appliances and the like.

In the arrangement of FIG. 12, PC 900 has a Nano-Browser according to an embodiment of the present invention and is enabled to communicate with proxy server 903 in the Simplified File Hypertext Protocol (SFHTP) described above. Optionally, a normal browser may be expanded by adding plug-ins for enhanced files and protocols.

In this case PS 903 and PC 900 record identity and characteristics of appliances 906–908. PC 900 makes requests of PS 903 on behalf of appliances 906–908, and PS 903 simplifies data files for these devices according to the pre-recorded characteristics of these devices, and transmits the simplified data to PC 900. PC 900 sends the data to the appropriate appliances. The communication in many cases, depending on the nature of the appliance, is two-way, such that the appliance (or a person operating an appliance) may make requests via the appliance to the PC.

Templates

The present inventor anticipates widespread applicability of the present invention to data network information movement, as the nature of the invention simplifies information movement and provides very significant virtual bandwidth expansion. Because of the nature of the simplifications that are made in data transmission in embodiments of the invention, being based on characteristics of receiving devices and appliances as well as applications (given by the WEB sites), and because there will be many of each type of device or appliance used in embodiments of the invention, the inventor has provided data templates for use in data simplification.

In the example of the Internet, data templates according to embodiments of this invention are standardized mini-applications adapted to translate standard WEB pages into content-reduced WEB pages adapted for a specific client and/or application (WEBsite/set of WEBsites). A finite number of default data templates are provided for translating the most common types of WEB pages for the most common types of clients. These default templates are stored at enabled proxy servers and WEB servers adapted to transmit SFHTP. In the implementation of such templates, in some cases, a single WEB page may be translated for a particular client as a single simplified WEB page. In other cases one WEB page may be translated to a number of pages to be separately displayed on a client device.

In an embodiment of the invention clients are adapted via software to make new templates for specific WEB pages and client devices and appliances. A new template may be made by modifying a standard or default template. This modification may be done by a client accessing a special WEB page having access and links to standard templates and tools for template modification. In another aspect, tools may be provided on a client device along with default and standard templates. In this aspect a client can design a new template and upload the result to a server for use in file modification according to embodiments of this invention. Modification on a WEB page has the distinct advantage that the operation is platform-independent. Alternatively or in combination JAVA™ may be used. In proliferation of the present invention providers of WEB pages may well offer downloadable templates for the most common kinds of client devices, or Intranet operators may offer templates for client devices deployed for communication over the Intranet.

Figure 13A:
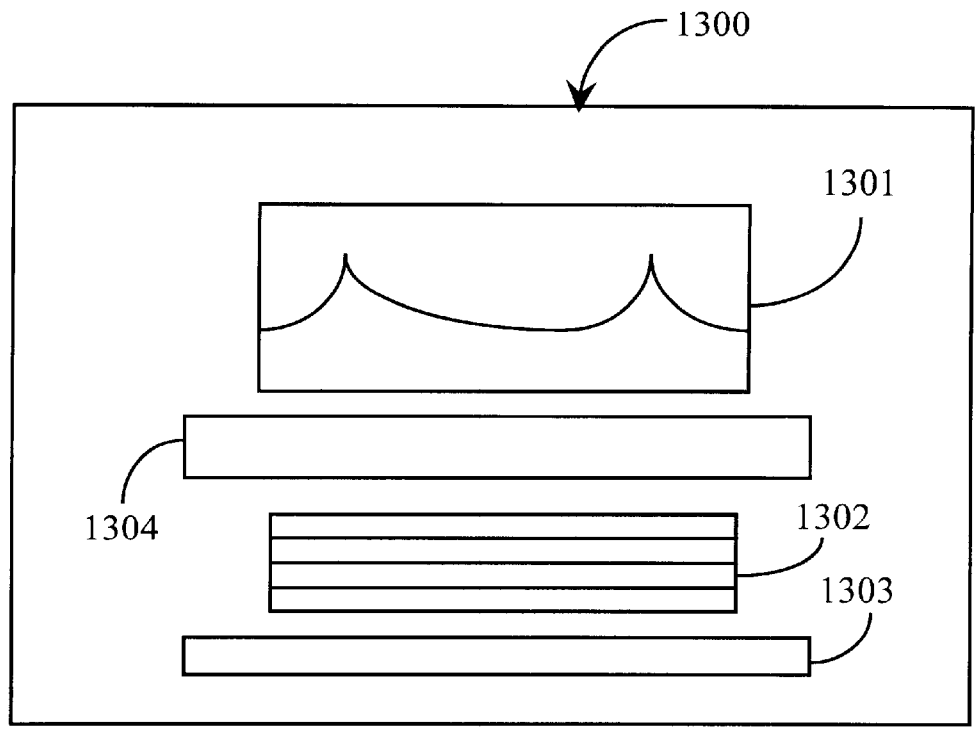
FIG. 13a is a diagram depicting a WEB page as known in the art.

FIG. 13a shows a typical WEB page 1300, containing several types of fields. After reviewing a WEB page such as shown in FIG. 13a, a user can designate zones (FIG. 13b) and incorporate these zones into a template for specifying translation of the WEB page for a client device. A template editor according to an embodiment of the present invention may allow a user or a WEB page owner (or representative) to choose a maximum zone size according to the capabilities of the targeted client device, which would be selected from a list before the zoning is done. Editing tools for such activity may be provided in the Editor by many means known in the art, such as pull-down menus, selection tools, and the like.

Figure 13B:
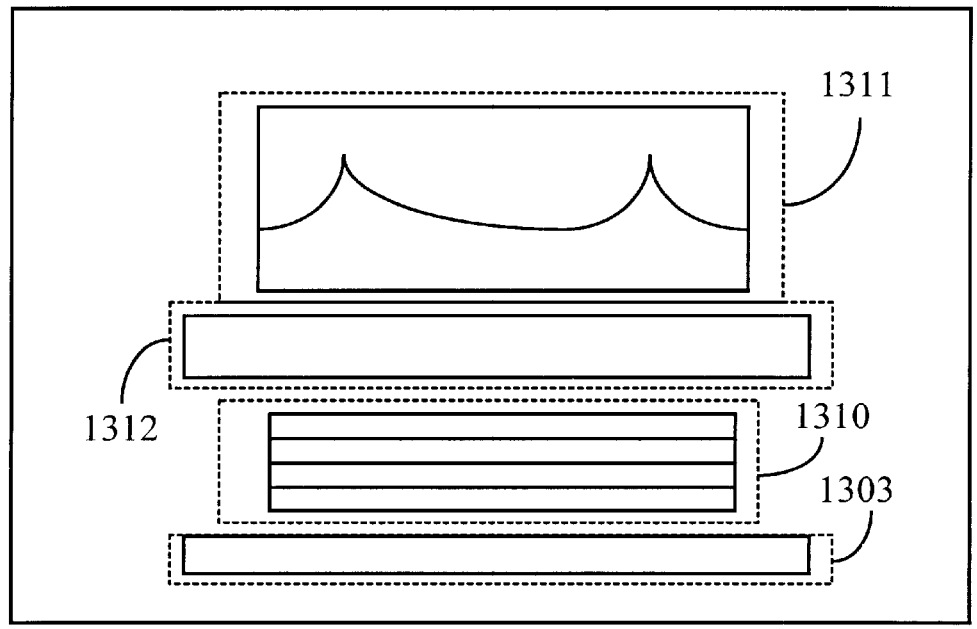
FIG. 13b is a diagram depicting the WEB page of FIG. 13a with zones applied according to an embodiment of the present invention.

In FIG. 13a there is a Graph area 1301, a data set 1302 associated with the graph area, a banner ad 1303, and a set of activity buttons 1304 for providing input decisions such as buy/sell etc. FIG. 13b shows the elements of FIG. 13a grouped into zones 1310–1313 for division and separation to be applied for a particular client device as a part of a translation template according to an embodiment of the present invention.

If the user makes his own template, he most likely would omit a zone for banner ad 1313. However, if the page provider would make the template, he most certainly will include the ad, for revenue reasons. Special zones allow in some cases conversion of multimedia files, such as text to speech, speech to text, text to music, text to software, text to video, video to text and so forth, which will be useful for many special devices and appliances, such as interactive dolls and the like, discussed elsewhere in this specification. The available types of zones again depends on the capabilities of the known client devices, and on availability of specific converters at the time.

Templates for non-screen appliances are especially interesting. Such templates may specify subsets of pages for transmission. As an example, in the case of a PC peripheral doll, one may access a weather forecasting page, and a template may be provided that will result in the doll doing a hula dance if the weather will be warm, and shivering if the forecast is for cold weather. This may be achieved by an on-the-fly translation of text data into other multimedia data format by the help of the template. Other types of conversions are also possible. Further, an appliance that plays downloaded MIDI data for music presentations may have a template which accesses only the video or audio content of a page. Other situations may use only text listed on pages and discard or ignore all data relating to borders and links. A template may also include a search function for laundering accessed pages for specific content or types of content, such a video or audio.

The inventor recognizes as well that WEB pages may be changed, developed, and updated. In the case of "independent" appliances, such updating is easily handled by updating a template associated with the WEB page and/or appliance.

Mark-Scripts

Given a system according to the present invention, a subscriber having a client device enabled for communication with an enabled server in a network such as the Internet will typically have a preferred sequence of accessing certain WEB sites. The subscriber may typically visit a weather service first, then a stockbroker service, and afterward a series of news sources. In such a circumstance a further enhancement may be made to speed up access and display even beyond the real-time performance provided by the reduced-content transmissions taught herein. If a client is following a sequence or wishes to follow a sequence, successive pages can be accessed and cached while previous pages are being viewed.

There are products in the art that provide for setting up a sequence for accessing WEB pages. In these products a sequence of URLs is entered, and the computer then accesses the WEB pages in order and catalogues the results, typically overnight for viewing in the morning. This is different than the system of the present invention. In the present invention a list is stored either at a client device or at an enabled proxy server. The system comprises not just the list of destinations, but executable control routines for implementing the accessing of the listed destinations and controlling interaction between a server and the client. The inventor terms the combination a Mark-Script, which is a cross between a list of bookmarks and a script.

As an example of a mark script and execution according to an embodiment of the present invention, a client uploads a sequence of URLs to a Proxy Server adapted for reduced-content data sharing according to the present invention. The client may then provide an initiation signal identifying the Mark-Script, and the server will access the first destination of the Mark-Script, translate the content according to the user's template, and transmit the result to the client device. While the user is viewing the first result, the Mark-Script accesses the second destination, performs the translation, and queues the data for transmission to the user after the user is finished with the data from the first destination. The process proceeds through all of the listed destinations and the results are queued in order for transmission, which typically requires a ready signal from the user.

The inventor recognizes that the user will spend a certain amount of time viewing or interacting with each page content transmitted, and that prefetched and temporarily stored further pages may be out-of-date by the time a viewer is ready to view. This will be more true for some pages, having content that changes rapidly, as opposed to other pages that seldom change at all. Accordingly provision is made in the Mark-Script system for refresh, wherein, if a user provides a refresh signal, the currently viewed page will be refreshed, and, in addition, all queued data will be refreshed as well, so data need not age unduly in the process. Alternatively, a maximum age might be set in the markscript, and if the user spends too much time on a page, following pages may be refreshed automatically, once they exceed the max age. Also a combination of manual and auto-refresh can be done.

Figure 14:
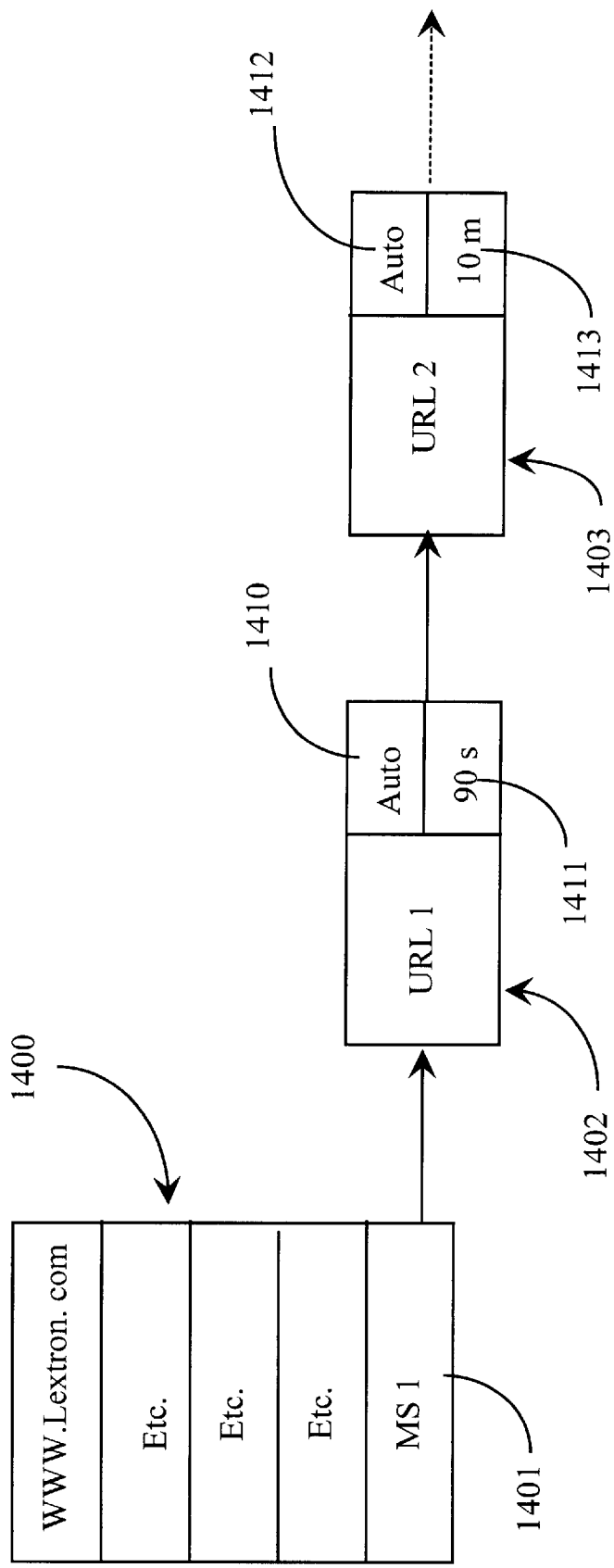
FIG. 14 is a block diagram illustrating organization and operation of Mark-Scripts according to an embodiment of the present invention.

FIG. 14 illustrates organization and use of Mark-Scripts according to an embodiment of the present invention. A bookmark scroll-down list 1400 has a Mark-Script MS1 (1401) included. The Mark-Script in this embodiment comprises a pointer chain of URLs, 1402, 1403 and so on, each with a URL and some associated parameters, such as whether to do auto refresh 1410 and 1412, and associated time periods 1411 and 1413. Other parameters not shown may include passwords, account names, info subsets etc.

RT Verification

The inventor recognizes that access to some WEB pages requires identification, such as a password and/or account information, and there are some that require interaction with such as a smart card or a PC card at the user's device. In these instances, as a Mark-Script running on a server executes, requests for security input and the like for pages being accessed are passed through the running page for the user to enter needed information, or to check a smart card or PC card etc connected to the client.

Non-WEB Sources

Examples provided thus far are closely associated with the Internet and WEB pages. Internet WEB pages, however, are not the only data sources that may be accessed in embodiments of the present invention. Data stored in remote legacy systems (other than WEB servers) may also be accessed and used. In this aspect a source-side template is provided that translates the retrieved data into HTML format. Then the proxy server in an embodiment of the present invention can use a client-associated template to reduce the files and transmit to the client.

As an example of use with a legacy system, a 3270 template may be created that will allow legacy IBM applications to be WEB-enabled,. Then client-side templates may be created that will support client devices, both screen-type and non-screen, including full PCs and workstations etc. In this embodiment, any PC with Intranet access may access any given legacy system, and use the data, as long as there is a source-side template.

Figure 15:
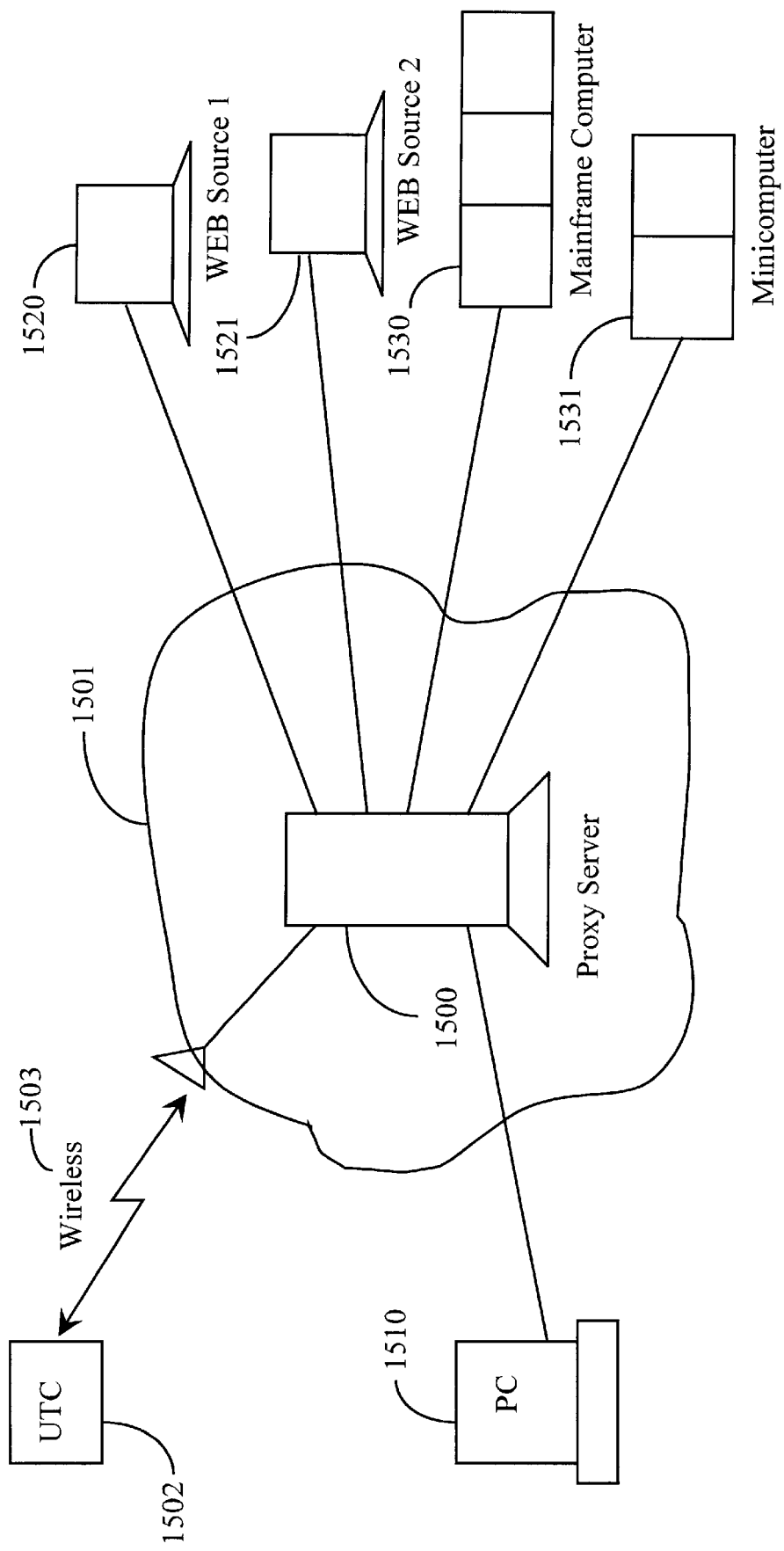
FIG. 15 is a diagram illustrating operation of a proxy server according to an embodiment of the present invention, with non-WEB page data sources incorporated.

FIG. 15 is a diagram illustrating operation of a proxy server according to an embodiment of the present invention, with non-WEB page data sources incorporated. A proxy server 1500 operating in a network 1501 according to an embodiment of the present invention accesses data from legacy systems 1530 and 1531 as well as from conventional WEB sources 1520 and 1521. Both legacy systems have a virtual connection to the proxy server, which then converts their input into HTML pages. These may be sent on to normal WEB clients such as PC/Workstation 1510, or to client devices such as wireless UTC (Ultra-Thin-Client) 1502. Of course all other types of clients described above may be involved as well. Also, there is some flexibility as to where and how conversion of legacy source data to HTML content takes place. In some cases it may be done at the legacy source, such as would be the case for a source that desires its data to be available both in the legacy format as WEB-compatible information. In other cases, the conversion can take place at the proxy server. For example, the proxy server may upload data from a legacy source, store it, and perform an HTML conversion at any time before providing the information to a client according to embodiments of the present invention. The proxy server may also apply any number of templates to the resulting information prior, to transmitting to various clients.

Additional Aspects for Interactive Dolls and Other Non-Screen Appliances

Programs for interactive PC peripheral dolls have been disclosed as provided on CD-ROM disks. Also, by being hosted by a PC or other computer, an interactive doll or other appliance may gain access to the Internet or other wide area data network, and may also benefit from reduced-content transmission according to embodiments of the present invention In one aspect of the present invention special programs for dolls and other appliances may be provided in special Internet WEB pages, and the data content reduced in transmission to a host system according to embodiments of the present invention. One example of such a page is for the weather doll described above, wherein the doll is enabled to dance for good weather and shiver for bad, and so forth. There are many other special functions that may be similarly provided for dolls and other non-screen appliances.

It will be apparent to those with skill in the art that there are many alterations that may be made in embodiments described without departing from the spirit and scope of the invention. Many of the unique functions, for example, are software enabled, and it is well-known that like functionality may be provided by programming in widely variant ways. Further, there are many alterations in connectability and architecture beyond those shown, that are still within the scope of the invention. The invention is limited only by the claims which follow:

What is claimed is:

1. A computing system comprising:

a client; and a server having server control routines and connected to the client by a data link;

wherein the server control routines, upon a request to download by a client, determine one or more of hardware and software characteristics of the client, transpose data, without further negotiation with the client, and transmit the transposed data to the client in a form specifically adapted to the characteristics of the client, and wherein, in the transposing, a first set of files is transposed into a second set of files fewer in number than the first set of files.

2. computing system as in claim 1 wherein the second set of files comprises a single file.

3. A computing system as in claim 1 wherein the number of files in the second set of files is a function of the characteristics of the client.

4. A computing system as in claim 1 wherein the server, after transposing the data, saves a copy of the transposed data for future communication with the same client or a client having the same or similar characteristics.

5. A computing system as in claim 1 wherein the server transposes HTML files.

6. A computing system as in claim 1 wherein, upon log-in at the server, the client transfers to the server information particular to the hardware or software characteristics of the client, and wherein the server incorporates the information in transposing data for transfer to the client.

7. A server in a client-server system comprising:

a data port for connecting to a client;

a facility for accessing data to be transferred to the client; and control routines for managing data preparation and transfer to the client:

wherein the control routines establish one or more of hardware and software characteristics of the client's device and, in response to a download request from the client, prepare and transmit data to the client in a form specifically adapted to the characteristics of the client, and wherein the control routines, in preparing the data for transfer to the client, transpose, without further negotiation with the client, a first set of files into a second set of files fewer in number than the first set of files before transferring the data to the client.

8. A server as in claim 7 wherein the second set of files comprises a single file.

9. A server as in claim 7 wherein the number of files in the second set of files is a function of the characteristics of the client.

10. A server as in claim 7 wherein, before transfer of data to a client, the control routines save a copy of transposed data for future communication with the same client or a client having the same or similar characteristics.

11. A server as in claim 7 wherein the server transposes HTML files.

12. A server as in claim 7 wherein, upon log-in at the server, the client transfers to the server information particular to the hardware or software characteristics of the client, and wherein the server incorporates the information in transposing data for transfer to the client.

13. A method for transferring data originally comprising multiple files by a server to a client, comprising steps of:

a) determining at the server, upon a request to download by a client, one or more of specific hardware and software and software characteristics of characteristics of the client;

b) transposing the data, without further negotiation with the client, according to the specific characteristics of the client, including reducing the number of files comprising the data; and c) transferring the transposed data to the client over a data link connecting the client to the server.

d) saving a copy of the data sent to the client for future use in communicating with the same client or with a client having the same or similar hardware characteristics.

14. The method of claim 13 wherein, in step (b), the number of files is reduced to a single file.

15. The method of claim 13 wherein the number of files in the data transferred to the client is a function of the specific hardware or software characteristics of the client.

16. The method of claim 13 wherein, in step (a), the specific hardware or software characteristics of the client are determined as a part of client log-in at the server.

* * * * *

(12) EX PARTE REEXAMINATION CERTIFICATE (5191st)
United States Patent
Kikinis

(10) Number: US 6,553,410 C1
(45) Certificate Issued: *Aug. 23, 2005

(54) SYSTEMS AND METHODS FOR TRANSPOSING DATA BY REMOVING AT LEAST ONE FILE THAT IS NOT SUPPORTED BY THE CHARACTERISTICS OF A CLIENT TO WHICH THE TRANSPOSED DATA IS TO BE TRANSMITTED

(75) Inventor: Dan Kikinis, Saratoga, CA (US)

(73) Assignee: Inpro Licensing Sarl, Luxembourg (LU)

( * ) Notice: This patent issued on a continued prosecution application filed under 37 CFR 1.53(d), and is subject to the twenty year patent term provisions of 35 U.S.C. 154(a)(2).

This patent is subject to a terminal disclaimer.

Reexamination Request:
No. 90/006,849, Nov. 7, 2003

Reexamination Certificate for:
Patent No.: 6,553,410
Issued: Apr. 22, 2003
Appl. No.: 09/073,019
Filed: May 4, 1998

Related U.S. Application Data

(63) Continuation-in-part of application No. 08/997,039, filed on Dec. 23, 1997, now abandoned, which is a continuation-in-part of application No. 08/791,249, filed on Jan. 30, 1997, now Pat. No. 6,076,109, which is a continuation-in-part of application No. 08/629,475, filed on Apr. 10, 1996, now Pat. No. 5,727,159, which is a continuation-in-part of application No. 08/606,757, filed on Feb. 27, 1996, now Pat. No. 5,746,602.

(51) Int. Cl.[7] .............................................. G06F 13/00
(52) U.S. Cl. ...................... 709/246; 709/236; 709/219; 709/203
(58) Field of Search ................................ 709/247, 217, 709/218, 219, 227, 228, 246, 276, 203; 707/1; 358/403; 386/101; 379/93.24; 455/26.1

(56) References Cited

U.S. PATENT DOCUMENTS

| | | | | |
|---|---|---|---|---|
| 5,379,340 A | * | 1/1995 | Overend et al. | 379/93.24 |
| 5,493,692 A | * | 2/1996 | Theimer et al. | 455/26.1 |
| 5,764,235 A | | 6/1998 | Hunt et al. | 345/428 |
| 5,953,506 A | | 9/1999 | Kalra et al. | 395/200.61 |

FOREIGN PATENT DOCUMENTS

JP  10-21165  1/1998

* cited by examiner

Primary Examiner—Le Hien Luu

(57) ABSTRACT

A system is provided for improving data transmission to computers and computerized appliances connected directly or indirectly to the Internet or other wide area data network. In this system software at a proxy server uses prestored characteristics of client devices to translate data from Internet sources into a reduced-content form adapted specifically to the client device. Unique functionality for the system includes templates provided for specifying WEB page to client translation, and special scripts for prefetching pages in real-time. Systems are provided for many sorts of client devices and hosted devices.

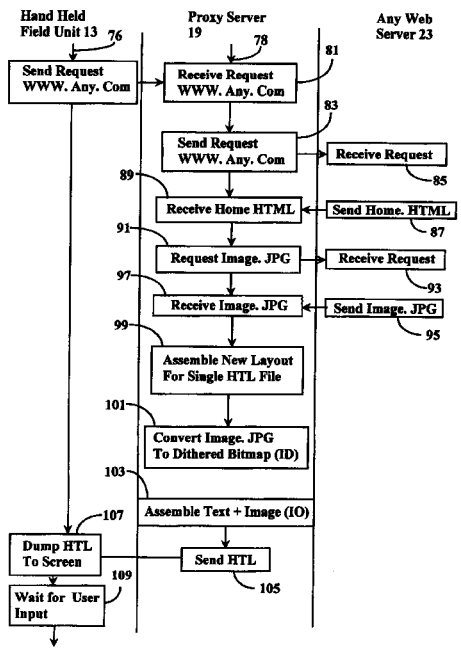

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 7 and 13 are determined to be patentable as amended.

Claims 2–6, 8–12 and 14–16, dependent on an amended claim, are determined to be patentable.

1. A computing system comprising:
    a client; and
    a server having server control routines and connected to the client by a data link;
        wherein the server control routines, upon a request to download by a client, determine one or more of hardware and software characteristics of the client, transpose data, without further negotiation with the client, and transmit the transposed data to the client in a form specifically adapted to the characteristics of the client, and
    wherein, in the transposing, a first set of files is transposed into a second set of files fewer in number than the first set of files *and at least one file from the first set of files that is not supported by the characteristics of the client is not included in the second set of files.*

7. A server in a client-server system comprising:
    a data port for connecting to a client;
    a facility for accessing data to be transferred to the client; and
    control routines for managing data preparation and transfer to the client;
        wherein the control routines establish one or more of hardware and software characteristics of the client's device and, in response to a download request from the client, prepare and transmit data to the client in a form specifically adapted to the characteristics of the client, and
    wherein the control routines, in preparing the data for transfer to the client, transpose, without further negotiation with the client, a first set of files into a second set of files fewer in number than the first set of files before transferring the data to the client, *wherein at least one file from the first set of files that is not supported by the characteristics of the client is not included in the second set of files.*

13. A method for transferring data originally comprising [multiple] *a set of* files by a server to a client, comprising steps of:
    a) determining at the server, upon a request to download by a client, one or more of specific hardware and software and software characteristics of characteristics of the client;
    b) transposing the data, without further negotiation with the client, according to the specific characteristics of the client, including reducing the number of files comprising the data, *wherein at least one of the files comprising the data that is not supported by the characteristics of the client is not included in the transposed data*; and
    c) transferring the transposed data to the client over a data link connecting the client to the server.
    d) saving a copy of the data sent to the client for future use in communicating with the same client or with a client having the same or similar hardware characteristics.

\* \* \* \* \*